US012610281B2

(12) United States Patent
Belur Ramachandra et al.

(10) Patent No.: US 12,610,281 B2
(45) Date of Patent: Apr. 21, 2026

(54) MULTI-USER (MU) COMMUNICATION IN A WIRELESS MESH NETWORK

(71) Applicant: QUALCOMM Incorporated, San Diego, CA (US)

(72) Inventors: Vinod Belur Ramachandra, Chennai (IN); Xiaolong Huang, Santee, CA (US); Shanmuganathan Palanisamy, Chennai (IN); Rajakumar Ebenezar Devairakkam, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 409 days.

(21) Appl. No.: 17/998,342

(22) PCT Filed: Jun. 30, 2021

(86) PCT No.: PCT/US2021/040022
§ 371 (c)(1),
(2) Date: Nov. 9, 2022

(87) PCT Pub. No.: WO2022/006359
PCT Pub. Date: Jan. 6, 2022

(65) Prior Publication Data
US 2023/0232282 A1 Jul. 20, 2023

(30) Foreign Application Priority Data

Jul. 3, 2020 (IN) .............................. 202021028332

(51) Int. Cl.
*H04W 28/16* (2009.01)
*H04L 5/00* (2006.01)
(Continued)

(52) U.S. Cl.
CPC ........... *H04W 28/16* (2013.01); *H04L 5/0007* (2013.01); *H04W 40/24* (2013.01); *H04W 84/18* (2013.01)

(58) Field of Classification Search
None
See application file for complete search history.

(56) References Cited

U.S. PATENT DOCUMENTS 6,345,294 B1 * 2/2002 O'Toole .................... H04L 9/40
709/222
7,299,301 B1 * 11/2007 Verma ..................... H04L 61/25
370/389

(Continued)

FOREIGN PATENT DOCUMENTS

| WO | WO-2006067922 A1 | 6/2006 |
| WO | WO-2018136254 | 7/2018 |
| WO | WO-2019027679 | 2/2019 |

OTHER PUBLICATIONS

Kelagadi H.M., et al., "A Cluster-Tree Based Topology Control for Wireless Sensor Network", 2018 International Conference on Electrical, Electronics, Communication, Computer, and Optimization Techniques (ICEECCOT), IEEE, Dec. 14, 2018, pp. 643-649, XP033719116.

(Continued)

*Primary Examiner* — Hassan A Phillips
*Assistant Examiner* — Gautam Sharma
(74) *Attorney, Agent, or Firm* — Holland & Hart LLP/Qualcomm

(57) ABSTRACT

This disclosure provides systems, methods, and apparatus, including computer programs encoded on computer storage media, for implementing multi-user (MU) communication in a wireless mesh network. A first mesh node or a network management unit may collect information from various mesh nodes and form MU association groups based on the (Continued)

information. An MU association group may include an MU group head that coordinates MU group communication to or from member mesh nodes that are in the MU association group. For example, the MU group head may coordinate orthogonal frequency division multiple access (OFDMA) resource unit allocations, or MU multiple-input-multiple-output (MU-MEMO) spatial stream configurations, among other examples. Different MU association groups may be formed for uplink or downlink traffic. The creation of MU association groups may enable a wireless mesh network to realize the advantages of MU group communication within the flexible topology of a mesh environment.

25 Claims, 16 Drawing Sheets

(51) Int. Cl.

| | | |
|---|---|---|
| *H04W 40/24* | (2009.01) | |
| *H04W 84/18* | (2009.01) | |

(56) References Cited

U.S. PATENT DOCUMENTS

| | | | | |
|---|---|---|---|---|
| 7,894,371 | B2 | 2/2011 | Bonta et al. | |
| 7,969,919 | B1 * | 6/2011 | Snodgrass | H04L 45/24 |
| | | | | 709/224 |
| 8,279,810 | B1 * | 10/2012 | Li | H04W 40/32 |
| | | | | 370/328 |
| 10,412,769 | B2 | 9/2019 | Cherian et al. | |
| 10,736,166 | B2 | 8/2020 | Abedini et al. | |
| 2003/0007461 | A1 * | 1/2003 | Chen | H04L 45/02 |
| | | | | 370/254 |
| 2003/0117966 | A1 * | 6/2003 | Chen | H04L 45/26 |
| | | | | 370/386 |
| 2006/0098607 | A1 | 5/2006 | Zeng et al. | |
| 2007/0109989 | A1 * | 5/2007 | Nakagawa | H04W 84/20 |
| | | | | 370/328 |
| 2007/0115906 | A1 * | 5/2007 | Gao | G06F 30/33 |
| | | | | 455/453 |
| 2009/0225763 | A1 * | 9/2009 | Forsberg | H04L 47/20 |
| | | | | 370/400 |
| 2009/0318183 | A1 * | 12/2009 | Hugl | H04W 52/42 |
| | | | | 455/522 |
| 2011/0110345 | A1 | 5/2011 | Heidari et al. | |
| 2012/0077531 | A1 * | 3/2012 | Acharya | H04W 72/542 |
| | | | | 455/507 |
| 2012/0163483 | A1 | 6/2012 | Stacey et al. | |
| 2012/0178462 | A1 * | 7/2012 | Kim | H04W 72/51 |
| | | | | 455/450 |
| 2013/0084868 | A1 * | 4/2013 | Song | H04W 36/0055 |
| | | | | 455/450 |
| 2014/0227974 | A1 | 8/2014 | Perkins et al. | |
| 2014/0266784 | A1 * | 9/2014 | Ratcliff | G01R 21/133 |
| | | | | 340/870.03 |
| 2015/0109981 | A1 | 4/2015 | Patil et al. | |
| 2015/0358973 | A1 | 12/2015 | Zeger et al. | |
| 2015/0373572 | A1 | 12/2015 | Sahin et al. | |
| 2016/0198445 | A1 * | 7/2016 | Ghosh | H04L 5/00 |
| | | | | 370/329 |
| 2016/0338080 | A1 * | 11/2016 | Gao | H04B 7/0452 |
| 2017/0063589 | A1 * | 3/2017 | Chen | H04L 5/0023 |
| 2017/0223665 | A1 | 8/2017 | Chun et al. | |
| 2018/0139679 | A1 | 5/2018 | Åström et al. | |
| 2020/0029350 | A1 * | 1/2020 | Asterjadhi | H04W 28/18 |
| 2020/0275313 | A1 * | 8/2020 | He | H04L 47/822 |
| 2023/0232282 | A1 * | 7/2023 | Belur Ramachandra | |
| | | | | H04W 28/16 |
| | | | | 370/252 |

OTHER PUBLICATIONS

Zhao M., et al., "A Cluster-Dynamic TDMA Slot Assignment Protocol for Large-Scale Mobile Ad Hoc Networks," 2019 IEEE 5th International Conference on Computer and Communications (ICCC), IEEE, Dec. 6, 2019, pp. 1142-1147, XP033754931.

Basagni S., "Distributed Clustering for Ad Hoc Networks", ISPAN '99: Proceedings of the 1999 International Symposium on Parallel Architectures, Algorithms and Networks, IEEE, 1999, pp. 1-15.

Hui, T., et al., "Wireless Mesh Architecture for IP-Based Base Stations", ZTE Communications, Release Date: Jun. 24, 2008, Issue No. 2, 2008, pp. 1-12, https://www.zte.com.cn/global/about/magazine/zte-communications/2008/2/en_5/162463.html.

International Search Report and Written Opinion—PCT/US2021/040022—ISA/EPO—Nov. 4, 2021.

Kelagadi H.M., et al., "A Cluster-Tree Based Topology Control for Wireless Sensor Network", 2018 International Conference on Electrical, Electronics, Communication, Computer, and Optimization Techniques (ICEECCOT), IEEE, Dec. 14, 2018 (Dec. 14, 2018), pp. 643-649, XP033719116, DOI: 10.1109/ICEECCOT43722.2018.9001417, [retrieved on Feb. 18, 2020] figure 1.

Zhao M., et al., "A Cluster-Dynamic TDMA Slot Assignment Protocol for Large-Scale Mobile Ad Hoc Networks," 2019 IEEE 5th International Conference on Computer and Communications (ICCC), IEEE, Dec. 6, 2019 (Dec. 6, 2019), pp. 1142-1147, XP033754931, DOI: 10.1109/ICCC47050.2019.9064334 [retrieved on Apr. 10, 2020] 1143 section III. A p. 1144, left column section 2, p. 1144, left-hand column first bullet point, p. 1143, figure 2.

Tamilselvi S., et al., "Traffic-aware Reliability Enhanced Cluster Head Selection Based Routing for Heterogeneous WSNs", International Journal of Innovative Technology and Exploring Engineering (IJITEE), vol. 9, No. 3, Jan. 30, 2020, pp. 2604-2609, XP093312422.

* cited by examiner

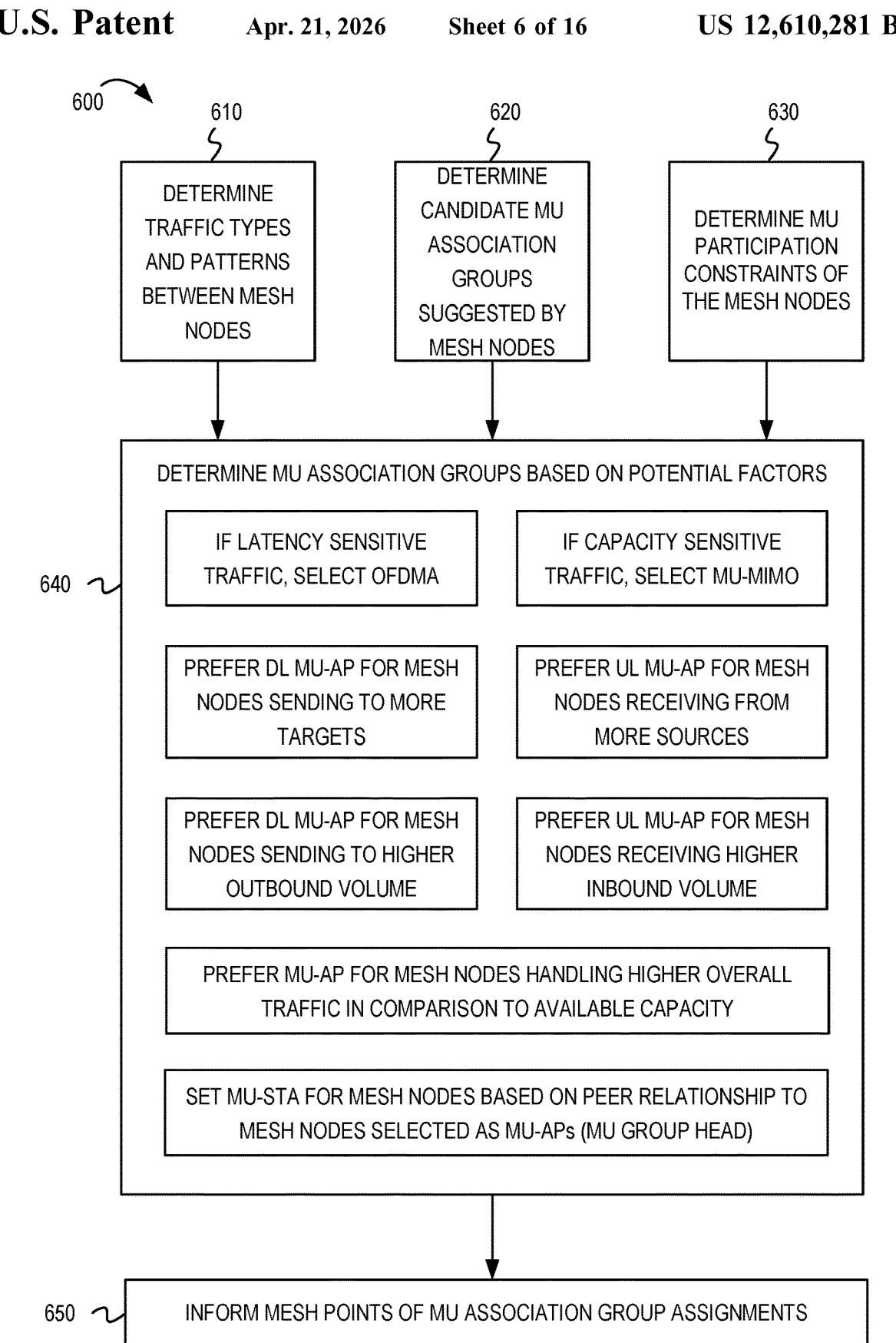

600

610
DETERMINE TRAFFIC TYPES AND PATTERNS BETWEEN MESH NODES

620
DETERMINE CANDIDATE MU ASSOCIATION GROUPS SUGGESTED BY MESH NODES

630
DETERMINE MU PARTICIPATION CONSTRAINTS OF THE MESH NODES

640
DETERMINE MU ASSOCIATION GROUPS BASED ON POTENTIAL FACTORS

IF LATENCY SENSITIVE TRAFFIC, SELECT OFDMA

IF CAPACITY SENSITIVE TRAFFIC, SELECT MU-MIMO

PREFER DL MU-AP FOR MESH NODES SENDING TO MORE TARGETS

PREFER UL MU-AP FOR MESH NODES RECEIVING FROM MORE SOURCES

PREFER DL MU-AP FOR MESH NODES SENDING TO HIGHER OUTBOUND VOLUME

PREFER UL MU-AP FOR MESH NODES RECEIVING HIGHER INBOUND VOLUME

PREFER MU-AP FOR MESH NODES HANDLING HIGHER OVERALL TRAFFIC IN COMPARISON TO AVAILABLE CAPACITY

SET MU-STA FOR MESH NODES BASED ON PEER RELATIONSHIP TO MESH NODES SELECTED AS MU-APs (MU GROUP HEAD)

650
INFORM MESH POINTS OF MU ASSOCIATION GROUP ASSIGNMENTS

OTHER
NETWORK

1010

1030

MESH
NODE
F

MESH
NODE
G

MESH
NODE
C

MESH
NODE
A

MESH
NODE
B

1020

MESH
NODE
D

MESH
NODE
E

1000

1200

MESH NODE
1300

1400

COMMUNICATE IN A WIRELESS MESH NETWORK THAT INCLUDES A PLURALITY OF MESH NODES    1410

ESTABLISH AT LEAST A FIRST MULTI-USER (MU) ASSOCIATION GROUP THAT INCLUDES A FIRST MESH NODE AND ONE OR MORE PEER MESH NODES OF THE PLURALITY OF MESH NODES, THE FIRST MU ASSOCIATION GROUP ENABLING THE FIRST MESH NODE AS AN MU GROUP HEAD TO ALLOCATE WIRELESS CHANNEL RESOURCES FOR MU COMMUNICATION BETWEEN THE FIRST MESH NODE AND AT LEAST A SUBSET OF THE ONE OR MORE PEER MESH NODES THAT FORM THE FIRST MU ASSOCIATION GROUP    1420

*FIGURE 14*

1500

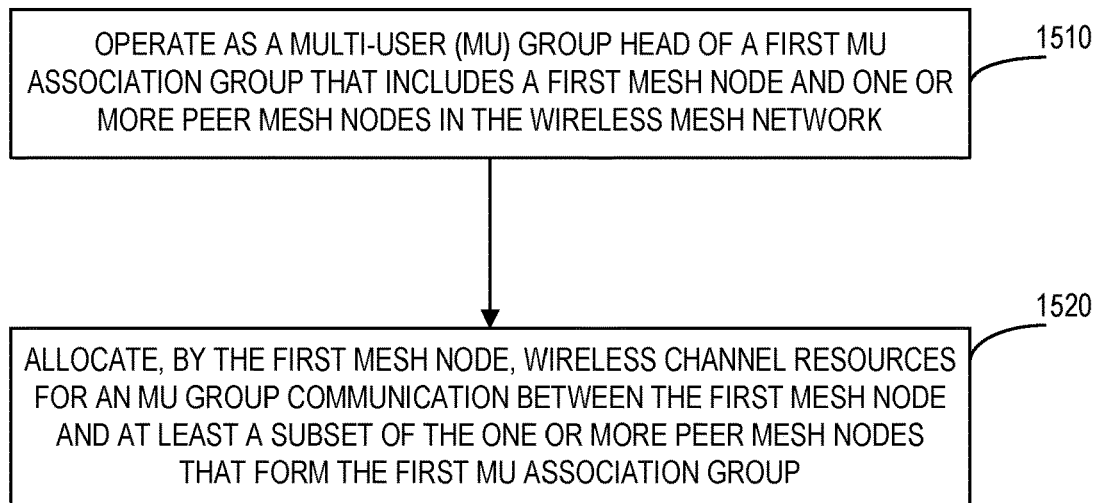

OPERATE AS A MULTI-USER (MU) GROUP HEAD OF A FIRST MU ASSOCIATION GROUP THAT INCLUDES A FIRST MESH NODE AND ONE OR MORE PEER MESH NODES IN THE WIRELESS MESH NETWORK

1510

ALLOCATE, BY THE FIRST MESH NODE, WIRELESS CHANNEL RESOURCES FOR AN MU GROUP COMMUNICATION BETWEEN THE FIRST MESH NODE AND AT LEAST A SUBSET OF THE ONE OR MORE PEER MESH NODES THAT FORM THE FIRST MU ASSOCIATION GROUP

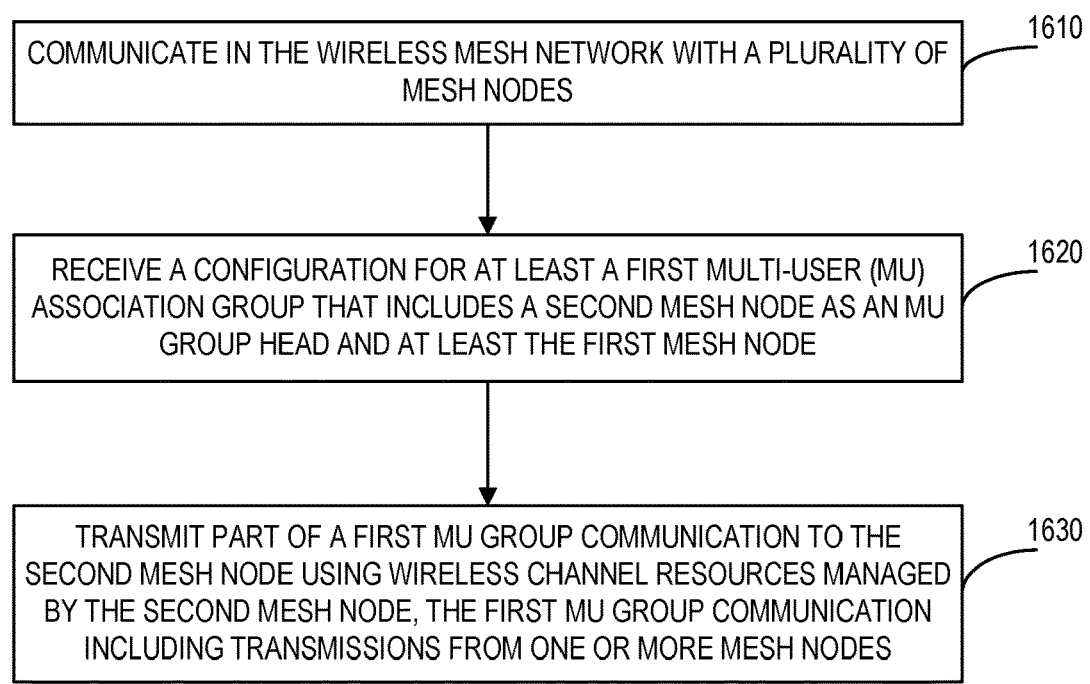

1600

COMMUNICATE IN THE WIRELESS MESH NETWORK WITH A PLURALITY OF MESH NODES — 1610

RECEIVE A CONFIGURATION FOR AT LEAST A FIRST MULTI-USER (MU) ASSOCIATION GROUP THAT INCLUDES A SECOND MESH NODE AS AN MU GROUP HEAD AND AT LEAST THE FIRST MESH NODE — 1620

TRANSMIT PART OF A FIRST MU GROUP COMMUNICATION TO THE SECOND MESH NODE USING WIRELESS CHANNEL RESOURCES MANAGED BY THE SECOND MESH NODE, THE FIRST MU GROUP COMMUNICATION INCLUDING TRANSMISSIONS FROM ONE OR MORE MESH NODES — 1630

MULTI-USER (MU) COMMUNICATION IN A WIRELESS MESH NETWORK

CROSS-REFERENCE TO RELATED APPLICATIONS

The present Application is a 371 national stage filing of International PCT Application No. PCT/US2021/040022 by BELUR RAMACHANDRA et al. entitled "MULTI-USER (MU) COMMUNICATION IN A WIRELESS MESH NETWORK," filed Jun. 30, 2021; and claims priority to India Provisional Patent Application No. 202021028332 by BELUR RAMACHANDRA et al. entitled "MULTI-USER (MU) COMMUNICATION IN A WIRELESS MESH NETWORK," filed Jul. 3, 2020, each of which is assigned to the assignee hereof, and each of which is expressly incorporated by reference in its entirety herein.

TECHNICAL FIELD

Aspects of the present disclosure relate generally to wireless communication, including multi-user (MU) communication in a wireless mesh network.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS). An infrastructure BSS (IBSS) is managed by an AP that provides a distribution and access function for associated STAs. An AP periodically broadcasts beacon frames to enable any STAs within wireless range of the AP to establish or maintain a communication link with the WLAN. Multiple APs can form an Extended Service Set (ESS) which is a collection of infrastructure BSSs managed by the multiple APs.

The IEEE 802.11 family of standards also support the creation of a wireless mesh network. A wireless mesh network may have advantageous properties in terms of quality of service, robustness, range extension, and density. A wireless mesh network is made up of mesh nodes that form a mesh BSS (MBSS). An MBSS differs from an IBSS in that each mesh node provides a distribution and access function for other associated mesh nodes in the wireless mesh network. Each mesh node may include a mesh STA, which is a logical architectural component that implements mesh protocols for communicating with other mesh STAs in the MBSS. For example, the mesh STAs establish wireless links with neighbor mesh STAs forming a mesh network topology in which the mesh STAs can mutually communicate via a wireless communication medium.

SUMMARY

The systems, methods, and devices of this disclosure each have several innovative aspects, no single one of which is solely responsible for the desirable attributes disclosed herein.

One innovative aspect of the subject matter described in this disclosure can be implemented as a method for wireless communication. The method may include communicating in a wireless mesh network that includes a plurality of mesh nodes according. The method may include establishing at least a first multi-user (MU) association group that includes a first mesh node and one or more peer mesh nodes of the plurality of mesh nodes. The first MU association group may enable the first mesh node as an MU group head to allocate wireless channel resources for MU communication between the first mesh node and at least a subset of the one or more peer mesh nodes that form the first MU association group.

Another innovative aspect of the subject matter described in this disclosure can be implemented as a method for wireless communication by a first mesh node of a wireless mesh network. The method may include the first mesh node operating as a MU group head of a first MU association group that includes the first mesh node and one or more peer mesh nodes in the wireless mesh network. The method may include the first mesh node allocating wireless channel resources for an MU group communication between the first mesh node and at least a subset of the one or more peer mesh nodes that form the first MU association group.

Another innovative aspect of the subject matter described in this disclosure can be implemented as a method performed by a first mesh node of a wireless mesh network. The method may include communicating in the wireless mesh network with a plurality of mesh nodes. The method may include receiving a configuration for at least a first MU association group that includes a second mesh node as an MU group head and at least the first mesh node. The method may include transmitting part of a first MU group communication to the second mesh node using wireless channel resources managed by the second mesh node. The first MU group communication may include transmissions from one or more mesh nodes.

Another innovative aspect of the subject matter described in this disclosure can be implemented as a first mesh node. The first mesh node may include at least one modem configured to communicate in a wireless mesh network that includes a plurality of mesh nodes. The first mesh node may include a processing system configured to establish at least a first MU association group that includes the first mesh node and one or more peer mesh nodes of the plurality of mesh nodes. The first MU association group may enable the first mesh node as an MU group head to allocate wireless channel resources for MU communication between the first mesh node and at least a subset of the one or more peer mesh nodes that form the first MU association group.

Another innovative aspect of the subject matter described in this disclosure can be implemented as a first mesh node. The first mesh node may include at least one modem configured to operate as a MU group head of a first MU association group that includes the first mesh node and one or more peer mesh nodes in the wireless mesh network. The first mesh node may include a processing system configured to allocate wireless channel resources for an MU group communication between the first mesh node and at least a subset of the one or more peer mesh nodes that form the first MU association group.

Another innovative aspect of the subject matter described in this disclosure can be implemented as a first mesh node. The first mesh node may include at least one modem configured to communicate in the wireless mesh network with a plurality of mesh nodes. The at least one modem may be configured to obtain a configuration for at least a first MU association group that includes a second mesh node as an MU group head and at least the first mesh node. The first mesh node may include a processing system configured to manage a first MU group communication by the at least one modem in accordance with the configuration. The at least one modem may be configured to output part of the first MU group communication for transmission to the second mesh node using wireless channel resources managed by the second mesh node. The first MU group communication may include transmissions from one or more mesh nodes.

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

BRIEF DESCRIPTION OF THE DRAWINGS

FIG. 6 shows an overview of an example process for forming MU association groups.

FIG. 14 shows a flowchart illustrating an example process for a network management unit that enables MU communication in a wireless mesh network.

FIG. 15 shows a flowchart illustrating an example process for a mesh node that supports MU communication in a wireless mesh network.

FIG. 16 shows a flowchart illustrating another example process for a mesh node that supports MU communication in a wireless mesh network.

Like reference numbers and designations in the various drawings indicate like elements.

DETAILED DESCRIPTION

Figure 1:
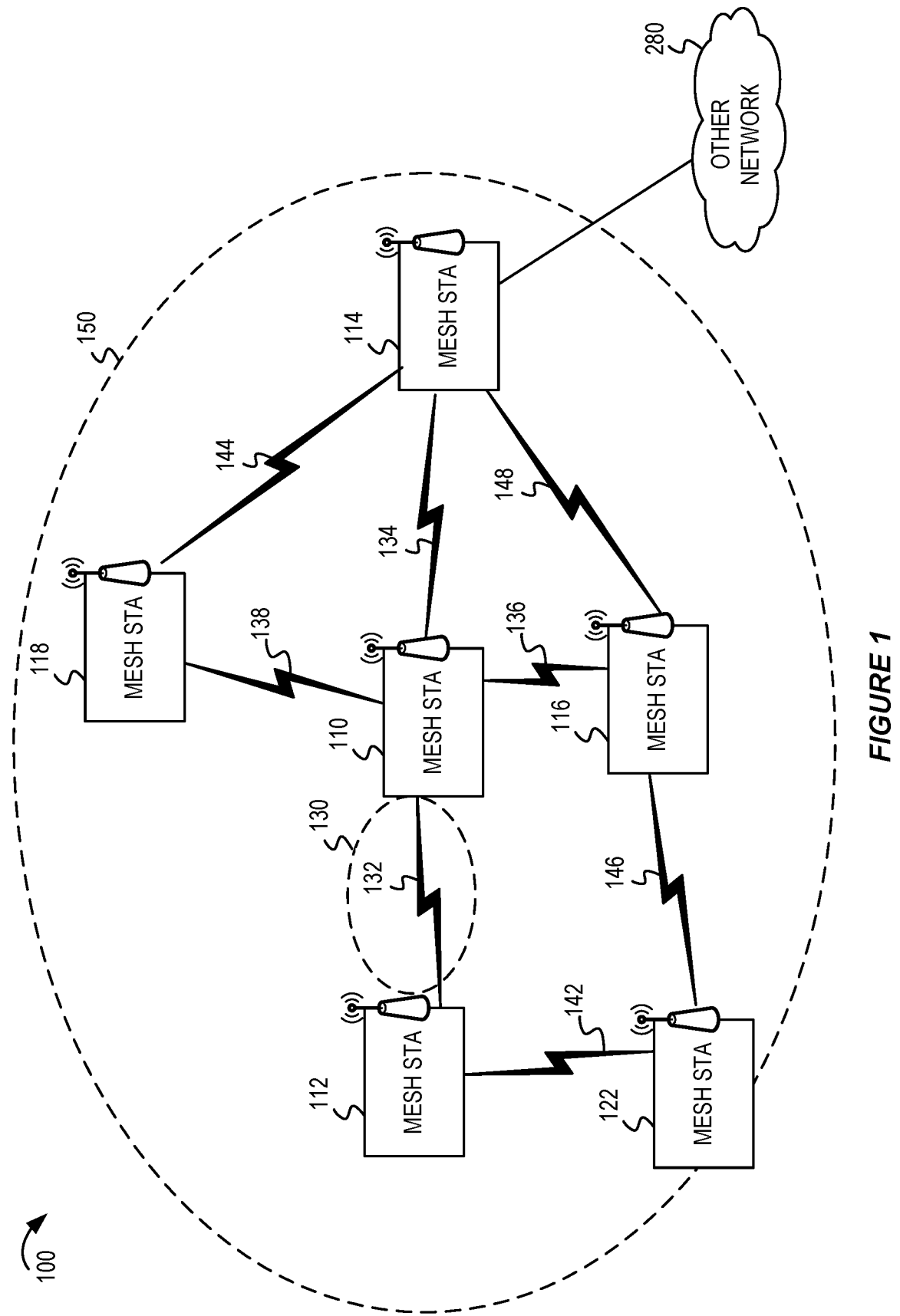
FIG. 1 shows a system diagram of an example wireless mesh network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU)-MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Some examples in this disclosure may be based on mesh nodes that implement a wireless mesh network protocol (such as specified in the IEEE 802.11s amendment incorporated into the IEEE 802.11-2016 specification). However, this disclosure is not limited to a particular wireless mesh network protocol. Furthermore, the descriptions of a mesh node may refer to any type of device that operates a mesh station (STA), including a high efficiency (HE) mesh STA, an extremely high throughput (EHT) mesh STA, or a next generation mesh STA, among other examples. An HE mesh STA is a type of mesh node that can implement the IEEE 802.11ax amendment to the IEEE 802.11 family of standards. An EHT mesh STA is a type of mesh node that can implement the IEEE 802.11be amendment to the IEEE 802.11 family of standards. For brevity, the examples in this disclosure may simply refer to a mesh node to include all such devices, and applicable to all such standards. A mesh node may include a mesh STA configured to participate in a wireless mesh network such as mesh Basic Service Set (MBSS). In some cases, a mesh node also may include other logical architectural components, such as an access point (AP) to provide an infrastructure Basic Service Set (IBSS) for non-mesh STAs, a mesh gate for translating traffic between the MBSS and an IBSS, a mesh portal for translating traffic between the MBSS and a non-802.11 network, or any combination thereof. In accordance with a wireless mesh network protocol, the mesh nodes may perform path selection and forwarding in the mesh network topology according to wireless mesh network protocol.

This disclosure provides systems, methods, and apparatus, including computer programs encoded on computer-readable media, to enable multi-user (MU) group communication within a wireless mesh network. MU group communication enables concurrent transmissions of different data (such as distinct data for each recipient device), from one device to each of multiple devices (for example, multiple simultaneous downlink (DL) communications from an AP to corresponding STAs), or concurrent transmissions of different data from multiple devices to a single device (for example, multiple simultaneous uplink (UL) transmissions from corresponding STAs to an AP). MU group communication is different from traditional multicast communication (in which the data sent to all recipients is the same). An MU group communication from a source (such as an MU group head) to multiple recipients (such as selected MU group members) may include distinct data for each recipient bundled as a concurrent transmission. To support the MU group communications, the AP and STAs may utilize multi-user multiple-input, multiple-output (MU-MIMO) and multi-user orthogonal frequency division multiple access (MU-OFDMA, or more commonly shortened as "OFDMA") techniques. OFDMA enables MU group communication by subdividing a wireless channel into resource units (RUs) that can be allocated to different devices. MU-MIMO allows for MU-communication by allocating different spatial streams to different devices. The use of MU group communication provides greater flexibility to manage the allocation of resources within a wireless network. The IEEE 802.11ax and IEEE 802.11be amendments to the IEEE 802.11 family of standards provide technical specifications for MU communication in an IBSS. Advantages to implementing MU group communication capability in a wireless mesh network may exist, such as improved utilization of a wireless channel, better quality of service, and efficiency in managing wireless channel resources.

In some aspects, a mesh node or a network management unit may form one or more MU association groups for the various mesh nodes in a wireless mesh network. An MU association group may refer to a group of mesh nodes that could be included in an MU group communication managed by an MU group head. The MU group head may manage wireless channel resources by allocating portions of the wireless channel resources to respective mesh nodes that will participate in the MU group communication. The MU group head may serve as a moderator of the MU association group and may determine which mesh nodes (among those in the MU association group) to include in an MU group communication. For example, the MU group head may send a DL MU group communication to one or more mesh nodes within the MU association group or may trigger an UL MU group communication from one or more mesh nodes within the MU association group. Each MU group communication may include all or a subset of the mesh nodes in the MU association group as directed by the MU group head.

In some aspects, the group of mesh nodes in an MU association group may be assigned the same association ID (AID) by the MU group head. The MU group head may operate as a multi-user access point (MU-AP) in the MU association group. The other mesh nodes in the MU association group may operate as multi-user stations (MU-STAs) in the MU association group. Some aspects more specifically relate to determining MU group heads and selecting a type of MU group communication (such as OFDMA or MU-MIMO) for an MU association group. Furthermore, some aspects specifically relate to determining the MU association groups based on a routing topology of the wireless mesh network, hop counts, the type of traffic, direction of traffic, link capacity, a weighting based on routing topology, operational constraints of mesh nodes, or any combination thereof.

Mesh nodes may form peer relationships in which a mesh node may temporarily behave as an AP for another mesh node behaving as a STA, and vice versa. In some implementations, two mesh nodes may periodically alternate between an AP role and a STA role for the peer relationship. The wireless mesh network, having several mesh nodes organized by peer relationships, may be referred to as a multi-hop network because a communication may traverse several "hops" (several mesh nodes) in a path from a source device to a destination device. Each hop may refer to a particular direction (from a source mesh node to a next mesh node) and may have a particular traffic pattern (such as traffic load, traffic type, or airtime utilization). By observing the flow of traffic and collecting information from multiple mesh nodes, a network management unit or a mesh node may determine some MU association groups to optimize the wireless channel utilization for a particular hop.

A mesh node or network management unit may form one or more MU association groups to handle the flow of traffic more efficiently between mesh nodes that belong to the MU association groups. The MU association groups may be different based on incoming traffic and outgoing traffic. For example, a mesh node that sends a high volume of outgoing traffic may serve as an MU group head (taking an MU-AP role) so that it can concurrently transmit outgoing traffic (as a DL MU group communication) to multiple mesh nodes in an MU group communication. Similarly, a mesh node that receives a high volume of traffic from multiple mesh nodes may be assigned as an MU group head (taking an MU-AP role) so that it can schedule trigger-based (TB) UL MU group communications from multiple mesh nodes. This disclosure includes a description of various roles (such as MU-AP or MU-STA) that a mesh node may take within a MU association group.

In some implementations, the formation of MU association groups may be based on MU participation constraints. The MU participation constraints may limit the quantity of MU association groups in which a mesh node can be a member. The MU participation constraints may limit the quantity of MU association groups in the wireless mesh network and prioritize the formation of those MU association groups for which MU group communication is effective in utilizing channel resources.

Particular implementations of the subject matter described in this disclosure can be implemented to realize one or more of the following potential advantages. Wireless mesh network technology may be improved to support newer methods of communication and efficient sharing of channel resources. MU association groups may improve utilization of the wireless channel. An MU group head may manage MU group communication for UL or DL traffic so that multiple mesh nodes can be serviced concurrently using OFDMA or MU-MIMO. The use of MU group communication may increase overall performance and capacity of a wireless mesh network. The techniques of this disclosure may be used to form MU association groups on those mesh nodes where the performance impact of MU group communication is most significant. This may be useful, for example, when mesh nodes can join a limited number of MU association groups.

FIG. 1 shows a system diagram of an example wireless mesh network. A wireless mesh network also may be referred to as an ad hoc network, a wireless ad hoc network, or a peer-to-peer (P2P) network. A wireless mesh network can be a network implementing at least one of the IEEE 802.11 family of wireless communication protocol standards (such as that defined by the IEEE 802.11-2016 specification or amendments thereof including, but not limited to, 802.11s). In some cases, mesh STAs may form networks without APs or other equipment other than the mesh STAs themselves. For conciseness, the terms mesh node and mesh STA may be used interchangeably when referring to devices that participate in a wireless mesh network. A mesh STA may participate in a wireless mesh network by establishing a new wireless mesh network and authorizing other mesh STAs to join the wireless mesh network. Additionally, or alternatively, a mesh STA may participate in a wireless mesh network by joining an existing wireless mesh network that has been established by another mesh STA. In some implementations, each mesh STA in the wireless mesh network may have the capability to authorize other mesh STAs to join the wireless mesh network.

The example wireless mesh network 100 shown in FIG. 1 includes several example mesh STAs 110, 112, 114, 116, 118 and 122 that collectively participate in a wireless mesh network. The wireless mesh network 100 also may associated with a mesh Basic Service Set (MBSS) 150 that includes all the mesh STAs 110, 112, 114, 116, 118, and 122 that participate in the wireless mesh network 100. The MBSS 150 is formed as a result of a collection of peer relationships between peer mesh STAs that share compatible configurations for the wireless mesh network. The MBSS 150 may be associated with an MBSS identification, such as a mesh ID, which distinguishes it from other wireless mesh networks (not shown) that may be in the vicinity. Formation of the peer relationships may involve several messages (such as setting up a group key for each peer relationship, a unique association ID, or the like). In FIG. 1, a first mesh STA 110 has a peer relationship 130 with a second mesh STA 112. A wireless link 132 exists between the first mesh STA 110 and the second mesh STA 112. The wireless link 132 is shown as a single link, but in some respects, it may be considered a combination of two unidirectional relationships. For example, the first mesh STA 110 may behave as an AP and may have an association ID (AID) that represents the wireless link 132 to the second mesh STA 112 (behaving as a STA). At the same time, the second mesh STA 112 may behave as an AP for the first mesh STA 110 (behaving as a STA for this instance) and may have its own AID to represent the wireless link 132 to the first mesh STA 110. Thus, the wireless link 132 represents the two-way combination of peer relationships (shown as peer relationship 130) that the first mesh STA 110 and second mesh STA 112 have with one another. For brevity, the peer relationships for the other pairs for mesh STAs are not shown. However, the wireless links 138, 134, 136, 142, 144, 146 and 148 are illustrated to show the topology of the wireless mesh network 100.

The wireless mesh network 100 may be capable of routing traffic from one peer mesh STA through the multi-hop network to another peer mesh STA. For example, the second mesh STA 112 may communicate with the other network 180 by communicating via the wireless link 132 to the first mesh STA 110 which may relay the communication to the third mesh STA 114 via the wireless link 134. The routing of data frames may be coordinated using a path selection protocol used by the mesh STAs 110, 112, 114, 116, 118 and 122. For example, the path selection protocol may be Hybrid Wireless Mesh Protocol (HWMP). HWMP is a defined in IEEE 802.11-2016 and is inspired by a combination of on-demand ad hoc routing and tree-based routing. As seen in FIG. 1, it may be apparent that communication in a multi-hop wireless mesh network involves coordination of airtime used by the mesh STAs 110, 112, 114, 116, 118 and 122. The mesh STAs 110, 112, 114, 116, 118 and 122 may implement a mesh coordination function (MCF) controlled channel access (MCCA) protocol to manage congestion and medium reservation.

Figure 2:
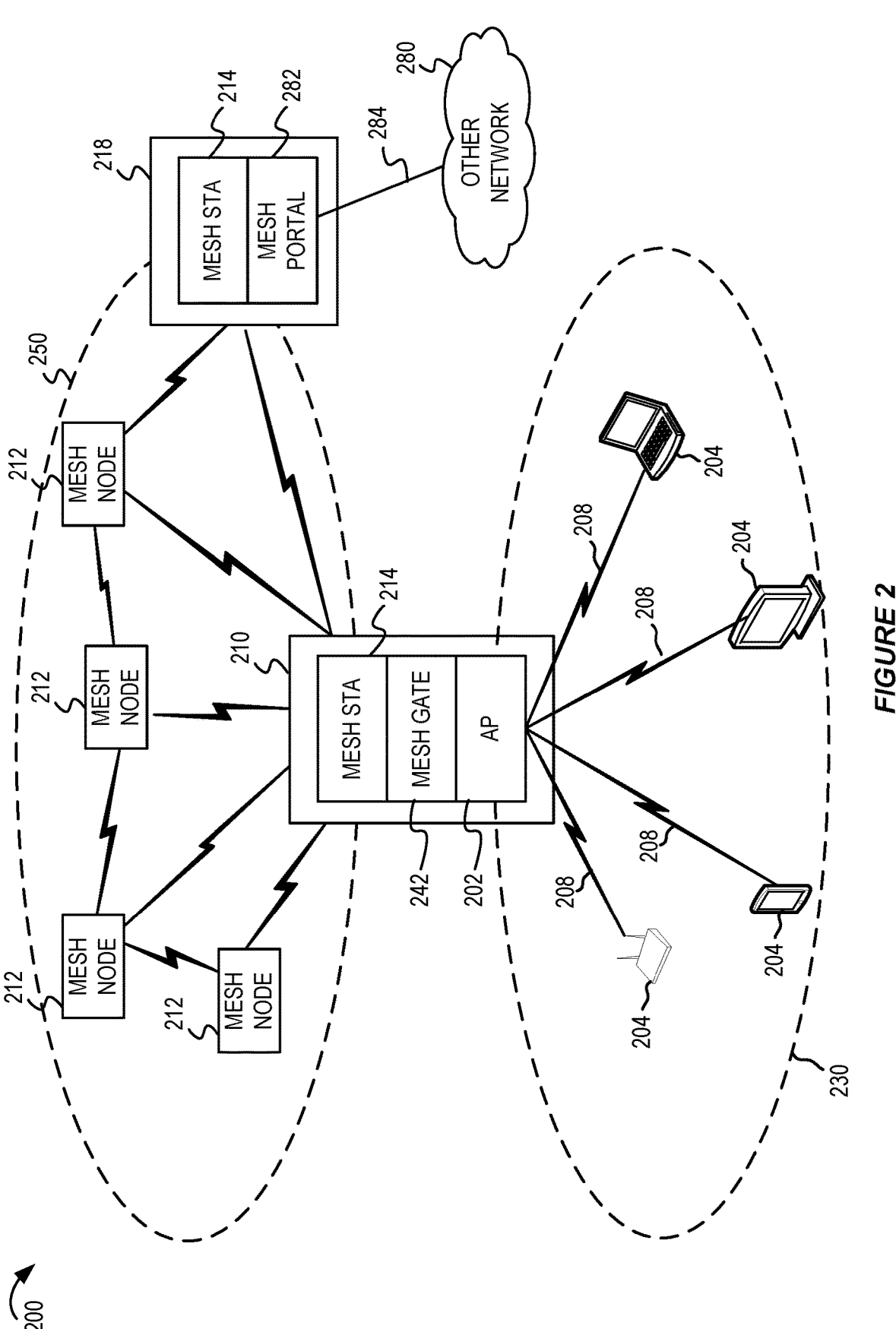
FIG. 2 shows a system diagram in which mesh nodes of an example wireless mesh network may enable connectivity to non-mesh networks.

FIG. 2 shows a system diagram in which mesh nodes of an example wireless mesh network may enable connectivity to non-mesh networks. The MBSS 250 in FIG. 2 may be similar to the MBSS 150 described with reference to FIG. 1.

The MBSS 250 may include a plurality of mesh nodes 210, 212 and 218. Each of the mesh nodes 210, 212 and 218 may include a mesh STA (such as the mesh STAs 110, 112, 114, 116, 118 and 122 described with reference to FIG. 1). The mesh nodes 210, 212 and 218 may function and communicate (via respective peer relationships) according to the IEEE 802.11 family of wireless communication protocol standards (such as that defined by the IEEE 802.11-2016 specification or amendments thereof including, but not limited to, 802.11s).

FIG. 2 illustrates some examples in which a mesh node also may include a mesh gate or a mesh portal. One example mesh node 218 in FIG. 2 includes a mesh STA 214 and a mesh portal 282. For example, the mesh portal 282 may be collocated, integrated or communicatively coupled to the mesh node 218. The mesh portal 282 may provide connectivity 284 for traffic between the MBSS 250 and another network 280 (such as a non-IEEE 802.11 network, a local area network, a home network, or the internet, among other examples). The mesh portal 282 may be a logical architectural component of the mesh node 218 and may translate packets between the MBSS 250 and the other network 280. Although FIG. 2 illustrates only one mesh node 218 with a mesh portal 282, it is possible for multiple mesh nodes to have mesh portals (not shown) to other networks.

An example mesh node 210 in FIG. 2 includes a mesh STA 214, a mesh gate 242, and an AP 202. The AP 202 may be collocated, integrated or communicatively coupled to the mesh node 210. The mesh gate 242 may provide connectivity between the MBSS 250 and an infrastructure BSS (IBSS) 230. The mesh gate 242 may be a logical architectural component of the mesh node 210 and may translate packets between the MBSS 250 and the IBSS 230. Although FIG. 2 illustrates only one mesh node 210 with a mesh gate 242, it is possible for multiple mesh nodes to have mesh gates and APs (not shown). The mesh node 210 also may be referred to as a mesh AP or mesh point (MP) because it includes the AP 202 operating an IBSS 230 and a mesh STA 214 for communication with the MBSS 250.

The AP 202 manages an IBSS 230 in which multiple non-mesh STAs (referred to as STAs 204 for brevity) can communicate with each other or the mesh gate 242 via the AP 202. Each of the STAs 204 also may be referred to as a mobile station (MS), a mobile device, a mobile handset, a wireless handset, an access terminal (AT), a user equipment (UE), a subscriber station (SS), or a subscriber unit, among other examples. The STAs 204 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 202 and an associated set of STAs 204 may be referred to as an infrastructure Basis Service Set (IBSS) (or Basic Service Set (BSS) when not referring to a wireless mesh network), which is managed by the respective AP 202. The IBSS 230 may be identified to users by a service set identifier (SSID), as well as to other devices by a basic service set identifier (BSSID), which may be a medium access control (MAC) address of the AP 202. The AP 202 periodically broadcasts beacon frames ("beacons") including the BSSID to enable any STAs 204 within wireless range of the AP 202 to "associate" or re-associate with the AP 202 to establish a respective communication link 208 (hereinafter also referred to as a "Wi-Fi link"), or to maintain a communication link 208, with the AP 202. For example, the beacons can include an identification of a primary channel used by the respective AP 202 as well as a timing synchronization function for establishing or maintaining timing synchronization with the AP 202.

To establish a communication link 208 with an AP 202, each of the STAs 204 is configured to perform passive or active scanning operations ("scans") on frequency channels in one or more frequency bands (for example, the 2.4 GHz, 5 GHz, 6 GHz or 60 GHz bands). To perform passive scanning, a STA 204 listens for beacons, which are transmitted by respective APs 202 at a periodic time interval referred to as the target beacon transmission time (TBTT) (measured in time units (TUs) where one TU may be equal to 2024 microseconds (μs)). To perform active scanning, a STA 204 generates and sequentially transmits probe requests on each channel to be scanned and listens for probe responses from APs 202. Each STA 204 may be configured to identify or select an AP 202 with which to associate based on the scanning information obtained through the passive or active scans, and to perform authentication and association operations to establish a communication link 208 with the selected AP 202. The AP 202 assigns an association identifier (AID) to the STA 204 at the culmination of the association operations, which the AP 202 uses to track the STA 204.

As a result of the increasing ubiquity of wireless networks, a STA 204 may have the opportunity to select one of many BSSs within range of the STA or to select among multiple APs (possibly collocated or integrated with one or more of the mesh nodes 212). A STA 204 can be covered by more than one AP and can associate with different APs at various times for different transmissions. Additionally, after association with an AP 202, a STA 204 also may be configured to periodically scan its surroundings to find a more suitable AP 202 with which to associate. For example, a STA 204 that is moving relative to its associated AP 202 may perform a "roaming" scan to find another AP 202 having more desirable network characteristics such as a greater received signal strength indicator (RSSI) or a reduced traffic load.

The APs 202 and STAs 204 may function and communicate (via the respective communication links 208) according to the IEEE 802.11 family of wireless communication protocol standards (such as that defined by the IEEE 802.11-2016 specification or amendments thereof including, but not limited to, 802.11ay, 802.11ax, 802.11az, 802.11ba, 802.11be and so on). These standards define the WLAN radio and baseband protocols for the PHY and medium access control (MAC) layers. The APs 202 and STAs 204 transmit and receive wireless communications (hereinafter also referred to as "Wi-Fi communications") to and from one another in the form of PHY protocol data units (PPDUs) (or physical layer convergence protocol (PLCP) PDUs). The APs 202 and STAs 204 in the WLAN 200 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 1100 MHz band. Some implementations of the APs 202 and STAs 204 described herein also may communicate in other frequency bands, such as the 6 GHz band, which may support both licensed and unlicensed communications. The APs 202 and STAs 204 also can be configured to communicate over other frequency bands such as shared licensed frequency bands, where multiple operators may have a license to operate in the same or overlapping frequency band or bands. Each PPDU is a composite structure that includes a PHY preamble and a payload in the form of a PHY service data unit (PSDU). The information provided in the preamble may be used by a receiving device to decode the subsequent data in the PSDU.

In traditional WLAN deployments, a single user (SU) access mode was based on contention-based access in which a station obtains the use of the full channel in the form of a transmit opportunity (TxOP) when it wins contention. Different priorities and access classes may be used by the WLAN to implement the prioritization of traffic. More recently, the IEEE draft 802.11ax technical standard implemented MU communications (such as OFDMA and MU-MIMO) which supports more efficient use of a wireless channel using either the scheduled access mode or the MU EDCA access mode. Using OFDMA and the scheduled access mode, an AP 202 may schedule airtime availability for different stations.

Figure 3A:
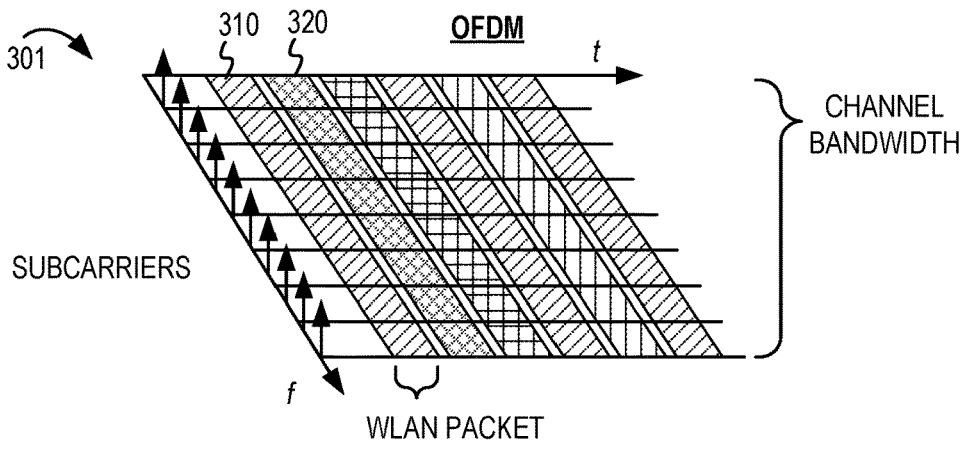
FIG. 3A shows an example conceptual diagram of orthogonal frequency division multiplexing (OFDM).

FIG. 3A shows an example conceptual diagram of OFDM 301. The OFDM channel width may include multiple subcarriers. A WLAN packet (also referred to as a PPDU) includes data that is encoded using the subcarriers of the channel bandwidth. For example, a first STA may transmit a first PPDU 310 at a first time period. During a second time period, a second STA may transmit a second PPDU 320. The PPDUs 310 and 320 may be different lengths of time. Typically, the first STA and the second STA (and any other STAs in the BSS) will contend for access to the channel. Once the STA wins the contention, the STA can use the channel for transmission of a PPDU. As shown in FIG. 3A, different shading of the PPDUs indicates that different STAs may utilize the wireless channels sequentially, one at a time. However, this communication structure may be inefficient if a STA does not have enough data to justify using the full channel width.

Figure 3B:
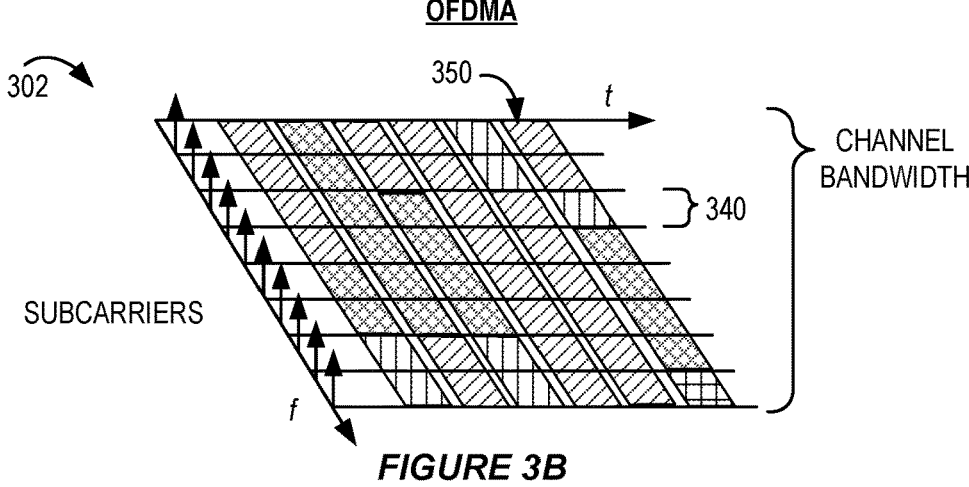
FIG. 3B shows an example conceptual diagram of multiple-user (MU) orthogonal frequency division multiple access (MU-OFDMA).

FIG. 3B shows an example conceptual diagram of MU-OFDMA 302. Using OFDMA, an AP may allocate portions of the channel bandwidth to different users. The portions of the channel bandwidth may be referred to as resource units (RUs). Each RU may include a different quantity of subcarriers (also referred to as "tones"). Different RUs may be allocated or assigned by an AP to different STAs at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs also may be allocated. Adjacent RUs may be separated by a null subcarrier (such as a DC subcarrier), for example, to reduce interference between adjacent RUs, to reduce receiver DC offset, and to avoid transmit center frequency leakage.

Using OFDMA, an AP may transmit downlink (DL) data to different STAs concurrently. The DL data may be signaled in different RUs that are allocated to the different STAs and indicated in a header of the DL OFDMA PPDU. For example, a DL OFDMA PPDU 350 may include different RUs allocated for a first STA, a second STA, a third STA, and a fourth STA. One RU 340 is allocated in the PPDU 350 for downlink data to a STA, while other RUs are allocated for different STAs.

RU allocations also may be used to schedule uplink (UL) channel access. For example, an AP can transmit a trigger frame to initiate and synchronize an UL OFDMA transmission from multiple STAs to the AP. Such trigger frames may thus enable multiple STAs to send UL traffic to the AP concurrently in time. A trigger frame may address one or more STAs through respective association identifiers (AIDs), and may assign each AID (and thus each STA) one or more RUs that can be used to send UL traffic to the AP. The UL trigger-based (TB) PPDU may be an aggregate of UL transmissions of different data (which also may be referred to as distinct data or node-specific data). In an MU group communication, the UL transmissions may be concurrently signaled by multiple STAs that transmit UL data in their respective RU allocation.

Figure 3C:
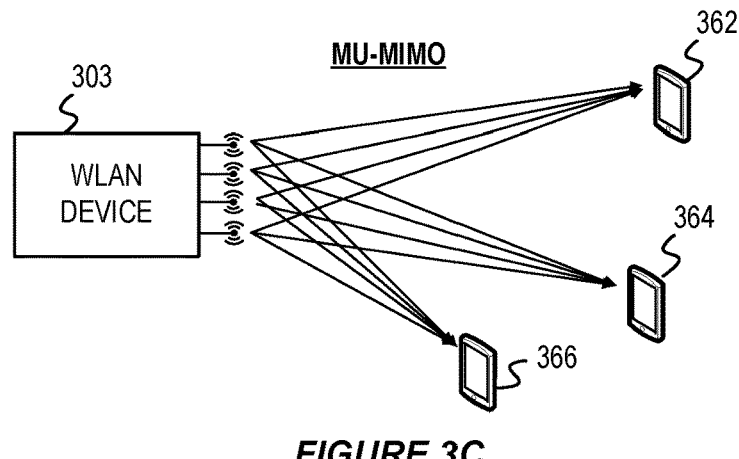
FIG. 3C shows an example conceptual diagram of MU multiple-input multiple-output (MIMO) (MU-MIMO).

FIG. 3C shows an example conceptual diagram of multiple-user (MU) multiple-input multiple-output (MIMO) (MU-MIMO). APs and STAs that include multiple antennas may support beamforming and spatial multiplexing. Beamforming refers to the focusing of the energy of a transmission in the direction of a target receiver. Beamforming may be used both in a single-user context, for example, to improve a signal-to-noise ratio (SNR), as well as in a multi-user (MU) context, for example, to enable MU-MIMO transmissions (also referred to as spatial division multiple access (SDMA)). To implement spatial multiplexing, the transmitting device divides a data stream into a number $N_{SS}$ of separate, independent spatial streams. The spatial streams are separately encoded and transmitted in parallel via the multiple transmit antennas. A WLAN device 303 (such as an AP with multiple transmit antennas) may allocate different spatial streams to different recipient devices 362, 364 and 366.

Figure 4:
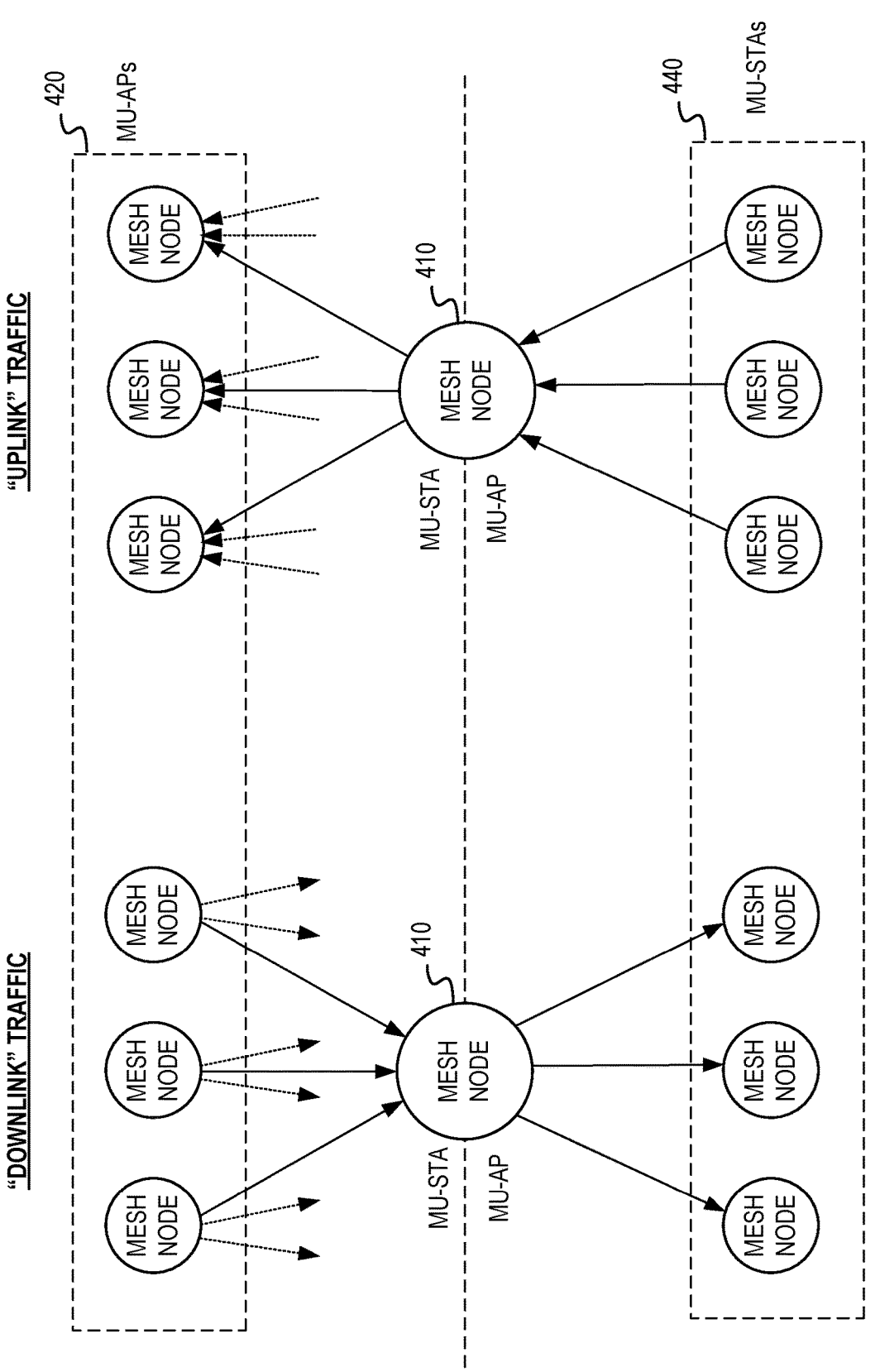
FIG. 4 shows example MU roles that a mesh node may have in a wireless mesh network.

FIG. 4 shows example MU roles that a mesh node 410 may have in a wireless mesh network. The OFDMA and MU-MIMO techniques for MU group communication described with reference to FIGS. 3B and 3C, respectively, have been implemented in infrastructure BSSs formed by an AP and multiple STAs. However, in a wireless mesh network, a mesh node may alternate its role between that of an AP and a STA. Thus, the mesh node may have flexibility to assume different types of roles for MU group communication in a wireless mesh network. The concept of uplink (UL) and downlink (DL) directionality is fluid in a wireless mesh network since any given mesh node may take on a role as an AP or a STA for peer mesh nodes and may alternate the role based on traffic conditions and the wireless mesh network configuration. Nonetheless, it is helpful to characterize traffic in and out of a mesh node using the UL and DL directionality concepts. In the examples of FIG. 4, the mesh node 410 and mesh nodes 420 are referred to as peer mesh nodes based on their peer relationship to communicate directly with each other. Similarly, the mesh node 410 and mesh nodes 440 are peer mesh nodes.

As described with reference to FIG. 4, the UL and DL directionality concepts may refer to the direction of traffic to or from, respectively, a mesh node operating as an MU-AP for another mesh node operating as an MU-STA. For example, the DL directionality may refer to a direction of traffic transmitted from the mesh node 410 to one or more mesh nodes 440 assuming the role of MU-STA and may refer to a direction of traffic received by the mesh node 410 from one or more mesh nodes 420 assuming the role of MU-AP. The left side of FIG. 4 shows potential roles that mesh node 410 may assume for DL traffic. For DL traffic, the wireless mesh node 410 may assume the role of an MU-AP when sending DL MU transmissions to one or more mesh nodes 440 assuming the role of MU-STA. The wireless mesh node 410 may assume the role of an MU-STA when receiving DL MU transmissions from one or more mesh nodes 420 assuming the role of MU-AP. The UL directionality may refer to a direction of traffic transmitted from the mesh node 410 to one or more mesh nodes 420 assuming the role of MU-AP and may refer to a direction of traffic received by the mesh node 410 from one or more mesh nodes 440 assuming the role of MU-STA. The right side of FIG. 4 shows potential roles that the mesh node 410 may assume for UL traffic. For UL traffic, the wireless mesh node 410 may assume the role of an MU-STA when sending UL MU transmissions to one or more mesh nodes 420 assuming the role of MU-AP. The wireless mesh node 410 may assume the role of an MU-AP to trigger and receive UL MU transmissions from one or more mesh nodes 440 assuming the role of MU-STA.

It may be apparent that the mesh node 410 may have different roles that receive MU transmissions from multiple mesh nodes. For example, the mesh node 410 may receive MU incoming transmissions as DL traffic (on the left side) as an MU-STA and may receive MU incoming transmissions as UL traffic (on the right side) as an MU-AP. While both the MU-AP and MU-STA roles may enable the mesh node 410 to receive MU incoming transmissions, there may be scenarios in which it is preferable for the mesh node 410 to operate as the MU-AP or the MU-STA. This disclosure includes various considerations which impact which role is preferable for a particular mesh node.

Each mesh node (such as mesh node 410) may have MU participation constraints that limit how many MU relationships (which may be referred to as a peer MU relationship) it can have for UL or DL traffic. Example of MU participation constraints include the maximum number of other mesh nodes for which a mesh node 410 can operate as an MU-AP or an MU-STA. The MU participation constraints may be different for each mesh node based on manufacturer configuration, user configuration, or system configuration. Furthermore, the MU participation constraints may be different for UL traffic and DL traffic. As an example, a mesh node 410 may support up to eight (8) MU connections as an MU-STA for DL MU traffic from one or more mesh nodes 420. That same mesh node 410 may support up to two (2) MU connections as an MU-STA for UL MU traffic to one or more mesh nodes 420. In some implementations, the MU participation constraints may be based on the quantity of intermediate hops at the mesh node or the size of the wireless mesh network. For example, the MU participation constraints for a particular mesh node may be a percentage of the total quantity of mesh nodes with which that particular mesh node has established peer relationships.

In some implementations, the selection of a role (MU-AP or MU-STA) for UL or DL traffic may depend on volume of traffic to or from a mesh node. For example, when a majority (by volume) of the traffic is incoming from multiple other mesh nodes, it may be preferable for the mesh node 410 to operate as an MU-AP so that it can schedule and trigger the incoming transmissions more efficiently. Alternatively, when the mesh node 410 is one of many mesh nodes directing a high volume of traffic to a destination mesh node, it may be preferable for the mesh node 410 to operate as an MU-STA so that the destination mesh node can operate as an MU-AP to manage its incoming traffic. The mesh node that operates as the MU-AP may allocate wireless channel resources for the MU group communication to or from the MU-STAs. In some implementations, the terms "allocate" or "allocating" also may refer to managing wireless channel resources for MU group communications.

In some implementations, the selection of a role (MU-AP or MU-STA) for UL or DL traffic may depend on the quantity of incoming or outgoing peer MU relationships in a routing topology for the wireless mesh network. It may be preferable for a mesh node 410 to operate as an MU-AP when that mesh node 410 has multiple incoming peer MU relationships. Conversely, when the mesh node 410 is one of many mesh nodes sending traffic to a same destination mesh node, it may be preferable for mesh node 410 to operate as an MU-STA. The quantity of incoming and outgoing peer MU relationships may be discoverable based on a routing protocol or logical topology of the wireless mesh network.

In some implementations, the selection of a role (MU-AP or MU-STA) for UL or DL traffic may depend on effective link capacity or bottlenecks in a path from a mesh node to or from another mesh node. In addition to different potential roles for the mesh node 410, the various roles may be used with different MU communication types, such as OFDMA or MU-MIMO. Selection of the MU communication type may depend on the type of traffic to or from a mesh node. For example, it may be preferable for the mesh node 410 to utilize OFDMA (either as MU-AP or MU-STA) for latency sensitive traffic. It may be preferable for the mesh node 410 to utilize MU-MIMO (either as MU-AP or MU-STA) for capacity sensitive traffic.

In some implementations, the selection of a role (MU-AP or MU-STA) for UL or DL traffic may depend on the number of hops from a mesh node to a mesh gate or mesh portal that connects the wireless mesh network to another network. It may be preferable for a mesh node 410 to operate as an MU-AP when that mesh node 410 has a lesser number of hops compared to multiple peer mesh nodes. It may be preferable for mesh nodes that have a higher number of hops compared to the MU-AP to operate as MU-STAs.

Furthermore, each mesh node may operate as an MU-STA for some peer mesh nodes and as an MU-AP for other peer mesh nodes. This disclosure introduces the concept of a MU association group which defines a collection of mesh nodes including a mesh node operating as an MU-AP and multiple mesh nodes operating as MU-STAs. The MU association groups may be determined by a network management unit based on traffic patterns, traffic type, and MU constraints of the mesh nodes. A mesh node may operate within multiple MU association groups. The MU association groups do not restrict a mesh node from transmitting or receiving single user (SU) communications with any its peer mesh nodes. However, by optimizing the MU association groups, the wireless mesh network may benefit from the advantages of MU group communications including spectral efficiency, fair distribution of channel resources, and coordinated scheduling of concurrent transmissions, among other examples.

Figure 5:
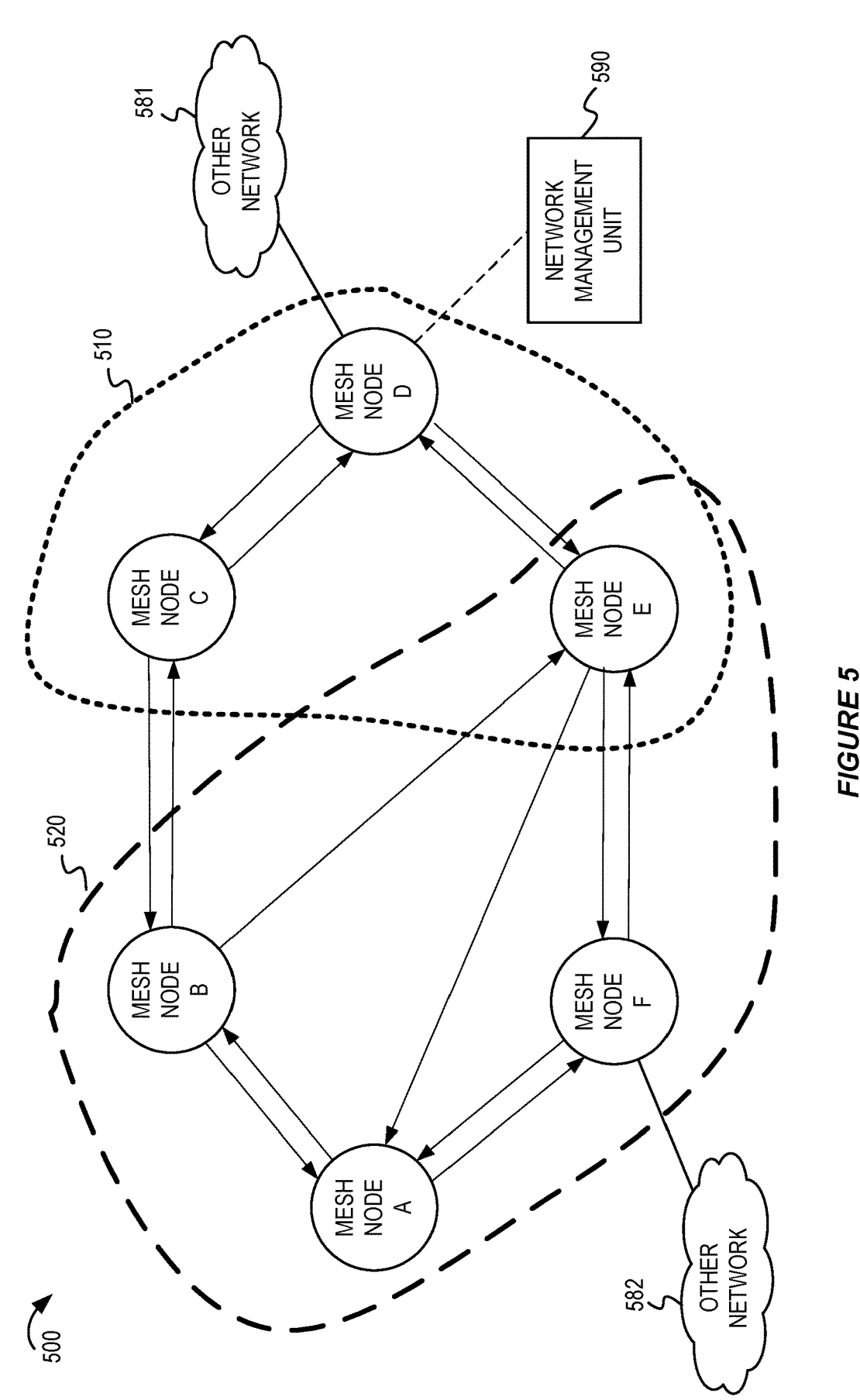
FIG. 5 shows an example wireless mesh network and example MU association groups.

FIG. 5 shows an example wireless mesh network 500 and example MU association groups. The example wireless mesh network 500 includes six mesh nodes, labeled mesh node A, mesh node B, mesh node C, mesh node D, mesh node E, and mesh node F. Mesh node D has a mesh portal to enable communication with another network 581. Mesh node F has a mesh portal to enable communication with another network 582.

As described previously, a wireless mesh network may use path selection protocol messages to determine, obtain, or generate a routing topology. A path selection protocol also may be referred to as a routing protocol in some implementations. Although sometimes referred to as a routing protocol or routing topology, the routes/paths in the wireless mesh network may be determined based on MAC layer (layer 2) forwarding rather than Internet protocol (IP) layer (layer 3) routing. The path selection protocol may determine paths in the wireless mesh network for various destinations, including the mesh portals at mesh nodes D and F. IEEE 802.11-2016 describes a mandatory path selection protocol, HWMP, that is based on an on-demand ad hoc routing and a tree-based routing scheme. In some implementations, the routing topology may be obtained, selected, or determined by a network management unit or by a mesh node that can use the routing topology to form the MU association groups. In some implementations, the network management unit or the mesh node may forward the routing topology to another mesh node to aid the other mesh node in forming the MU association groups.

Referring to the example wireless mesh network 500 in FIG. 5, the arrows between the mesh nodes A-F indicate the next hop paths determined by the path selection protocol. For example, mesh node A may send traffic to mesh node B and F. Mesh node B may send traffic to mesh node A, mesh node C and mesh node E. Mesh node C may send traffic to mesh node B and mesh node D. Mesh node D may send traffic to mesh node C, mesh node E and the other network 581. Mesh node E may send traffic to mesh node A, mesh node D and mesh node F. And mesh node F may send traffic to mesh node A, mesh node E and the other network 582. Using the next hop paths, the mesh nodes may "route" traffic from itself to any other mesh node in the wireless mesh network 500 or other networks 581 and 582. The next hop may be referred to as an intermediate hop in a routing topology for the wireless mesh network. In some implementations, each mesh node may be a mesh point and may include a mesh gate and AP so that they can provide an IBSS for traditional STAs (not shown) in the vicinity of the wireless mesh network 500. A mesh path may refer to the path between a mesh node and a mesh gate and may consist of a quantity of hops through the wireless mesh network based on the routing topology.

Merely as an example, consider a traditional STA (not shown) that is connected to an IBSS operated by an AP of the mesh node A. That STA may have a session to send or receive transmissions to a host (not shown) in the other network 581. The STA may communicate traffic to mesh node A which may select between its available next hop targets (mesh node F or mesh node B). In turn those mesh nodes may forward traffic to the next hop, and so on until the traffic traverses a path from mesh node A to mesh node D where the traffic may be translated and forwarded to the other network 581.

FIG. 5 also shows example MU association groups that may facilitate MU group communication among mesh nodes. For example, a first MU association group 510 may include mesh node D, mesh node C and mesh node E. The mesh node D may be designated as the MU group head of the first MU association group 510 and the mesh nodes C and E may be members of the first MU association group 510. Thus, the mesh node D may assume a role of an MU-AP and the mesh nodes C and E may assume a role of MU-STA. In the example shown in FIG. 5, the mesh node D may operate as an MU-AP for downlink transmission of different data (such as distinct or node-specific data) in an MU DL group communication to the other mesh nodes C and E in the first MU association group 510. Thus, the mesh node D may efficiently manage the wireless channel resources to concurrently transmit "downlink" traffic to mesh nodes C and E. In one scenario, the mesh node D may receive a large amount of "uplink" traffic from mesh nodes C and E, and thus may operate as an MU-AP to allocate wireless channel resources for uplink transmission of different data (such as distinct or node-specific data) in a MU UL group communication as well. It should be apparent that a device may operate as an MU-AP for one direction (such as UL or DL) and may operate as an MU-STA for traffic in the other direction. In the example shown in FIG. 5, the formation of the first MU association group 510 may be made based on the traffic information of traffic between the mesh node D and the mesh nodes C and E, link information regarding the links between the mesh nodes, or a combination thereof. For example, traffic information (which also may be referred to as traffic flow information) may include one or more of the direction of traffic, the type of traffic (such as whether the traffic is latency sensitive or capacity sensitive), or volume of traffic, among other examples. Link information may include one or more of the quantity of incoming and outgoing links from each mesh node, or effective capacities of various links, among other examples. In some implementations, the traffic information or link information may be obtained, selected, or determined by a network management unit or by a mesh node that can use that information during formation of the MU association groups. In some implementations, the network management unit or the mesh node may forward the traffic information or link information to another mesh node to aid the other mesh node in forming the MU association groups.

A second MU association group 520 is shown in FIG. 5. The second MU association group 520 may include mesh nodes A, B, E and F. The second MU association group 520 is shown to illustrate another example factor which may be considered in the formation of MU association groups. Mesh node A receives data from several mesh nodes B, E and F, while the other mesh nodes in the second MU association group 520 receive data from a fewer quantity of other mesh nodes. Thus, one potential factor in the formation of MU association groups may be the quantity of mesh nodes that are sourcing traffic to a destination mesh node or the quantity of destination mesh nodes that a particular mesh node to which the source mesh node sends traffic. In the example of FIG. 5, mesh node A may be the MU group head for the second MU association group 520 and may operate as an MU-AP to manage the UL MU group communication for traffic coming from peer mesh nodes B, E and F.

As shown in the example of FIG. 5, a mesh node may be in multiple MU association groups concurrently. For example, mesh node E may be a member as an MU-STA for both the first MU association group 510 and the second MU association group 520. It is also possible for a mesh node to concurrently serve as an MU group head (MU-AP) for one or more MU association groups and as a member (MU-STA) for one or more other MU association groups. For brevity, two MU association groups are shown in FIG. 5, but there may be many more MU association groups (not shown) depending on traffic conditions and topology of the wireless mesh network.

There are several factors that may be considered when forming the MU association groups for a wireless mesh network. For example, MU association groups may be formed based on the topology of the network (such as the locations of mesh portals that provide ingress and egress links), hop counts, the direction of traffic, the type of traffic (such as whether the traffic is latency sensitive or capacity sensitive), the quantity of incoming and outgoing links from each mesh node, volume of traffic, or effective capacities of various links, among other examples. A network management unit 590 (or a mesh node that operates as a network management unit) may form the MU association groups for the wireless mesh network. The network management unit 590 may collect information from the mesh nodes before forming the MU association groups.

The network management unit 590 may be located external to the mesh nodes or may be included in one of the mesh nodes. In some implementations, each mesh node may be capable of performing the functionality of the network management unit 590. One of the mesh nodes may be elected as a root mesh node. In some implementations, a wireless mesh protocol may include messaging for the election of a root mesh node and that mesh node may activate its network management unit to control various settings of the wireless mesh network including the determination of MU association groups. In some implementations, the network management unit 590 may be a centralized resource external from the mesh nodes in the wireless mesh network 500.

FIG. 6 shows an overview of an example process 600 for forming MU association groups. The operations of the process 600 may be implemented by a network management unit, a mesh node, a centralized resource or any component thereof as described herein. For example, the process 600 may be performed by a network management unit such as the network management unit 590 described with reference to FIG. 5. In some implementations, the process 600 (or portions thereof) may be performed by a mesh node, such as one of the mesh nodes 210, 212, 218, 410, mesh nodes A-F, mesh node 1300, or mesh node 1700 described with reference to FIGS. 2, 4, 5, 8, 13 and 17, respectively. In some implementations, the process 600 may be performed by a component of the mesh node, such as one of mesh STAs 110, 112, 114, 116, 118 and 122 described with reference to FIG. 1. For brevity, the example process 600 is described as being performed by an apparatus that could be any of the above indicated network management units, mesh nodes, mesh STAs, or a component thereof.

At block 610, the apparatus may determine traffic types and patterns between mesh nodes. For example, the apparatus may send a request or query to the mesh nodes to request traffic information from the perspective of each mesh node. In some implementations, the mesh nodes may be configured to communicate the traffic information to other mesh nodes or the network management unit either periodically or upon request. In some implementations, the apparatus may query those mesh nodes that serve as traffic ingress points to the wireless mesh network. The traffic information may indicate the source and destination of traffic that is traversing intermediate hops based on a routing topology of the wireless mesh network. The traffic information also may indicate whether the traffic on a particular intermediate hop is latency sensitive traffic or capacity sensitive traffic. In some implementations, the apparatus may inform the mesh nodes regarding traffic information that it collects or aggregates. In some implementations, the operation at block 610 may be omitted when a network management unit is configured to disregard traffic information as a factor in creating the MU association groups.

At block 620, the apparatus may determine candidate MU association groups suggested by mesh nodes. For example, each mesh node capable of operating as an MU-AP may determine the MU technology type (OFDMA or MU-MIMO) and potential MU-STAs for its DL traffic and UL traffic based on one or more criteria. The criteria may be based on traffic type and volume. For example, a first candidate MU association group may include MU-STA mesh nodes that have throughput sensitive traffic and high traffic load from or to a common MU-AP mesh node. The MU technology for the first candidate MU association group may be designated as MU-MIMO. A second candidate MU association group may include a group of MU-STA mesh nodes that have latency sensitive traffic and low traffic load from or to a common MU-AP mesh node. The MU technology for the second candidate MU association group may be designated as OFDMA. The thresholds for high traffic load and low traffic load may be based on a threshold amount, an average traffic load of all hops in the wireless mesh network, the average traffic load at ingress and egress points, or based on average traffic load for an intermediate hop. In some implementations, the threshold may be an offset or range of any of the aforementioned averages. To obtain the candidate MU association groups suggested by the mesh nodes, the apparatus may query the mesh nodes, or the mesh nodes may be configured to report the candidate MU association groups periodically or after triggered by a network change event or inquiry from the apparatus.

At block 630, the apparatus may determine the MU participation constraints of the mesh nodes. For example, the apparatus may query the mesh nodes to determine their MU participation constraints, or the mesh nodes may be configured to report their MU participation constraints.

Figure 7:
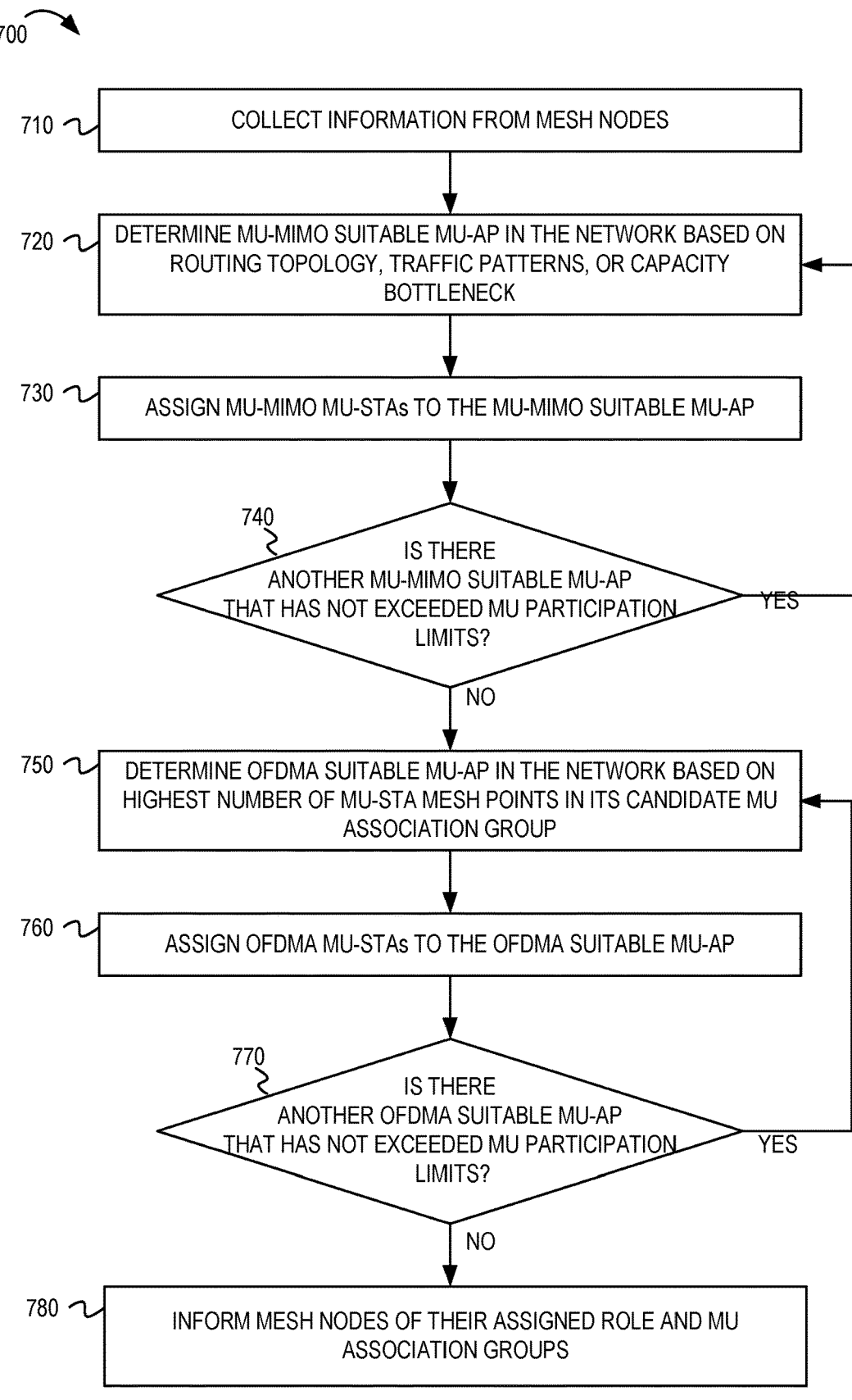
FIG. 7 shows a detailed example process in which a mesh node or a network management unit may form different MU association groups.

At block 640, the apparatus may determine the MU association groups based on one or more potential factors. The factors may include criteria based on traffic type, the MU participation constraints, the topology of the wireless mesh network, or the routing topology, among other examples. For example, the apparatus may determine an MU technology type as being OFDMA for latency sensitive traffic or MU-MIMO for capacity sensitive traffic. The apparatus may select mesh nodes that have a higher number of outgoing intermediate hops to target mesh nodes and designate those mesh nodes as MU group heads (as MU-AP) of a MU association group to manage DL MU group communications to one or more mesh nodes within the MU association group. The apparatus may select mesh nodes that have a higher number of incoming intermediate hops from source mesh nodes and designate those mesh nodes as MU group heads (as MU-AP) of a MU association group to manage UL MU group communications from one or more mesh nodes within that MU association group. The apparatus may select mesh nodes that have a higher amount of outgoing traffic to target mesh nodes and designate those mesh nodes as MU group heads (as MU-AP) of a MU association group to manage DL MU group communications to one or more mesh nodes within the MU association group. The apparatus may select mesh nodes that have a higher amount of incoming traffic from source mesh nodes and designate those mesh nodes as MU group heads (as MU-AP) of a MU association group to manage UL MU group communications from one or more mesh nodes within the MU association group. In some implementations, the selection of MU group heads and MU association groups may be based on capacity. For example, the apparatus may select mesh nodes that have a higher overall amount of traffic relative to available capacity and designate those mesh nodes as MU group heads (as MU-AP) of a MU association group for UL or DL traffic. After selecting MU group heads of MU association groups, the apparatus may designate the member mesh nodes (as MU-STAs) for each MU association group. The designation of member mesh nodes may be limited based on the MU participation constraints of each mesh node. FIG. 7 shows an example process 700 which makes use of the potential factors described in block 640 to determine MU association groups.

At block 650, the apparatus may inform the mesh nodes of the MU association group assignments. For example, the apparatus may send a message that indicates the MU group head and a list of members for particular MU association groups determined at block 640.

FIG. 7 shows a detailed example process in which a mesh node or a network management unit may form different MU association groups. The operations of the process 700 may be implemented by a network management unit, a mesh node, a centralized resource or any component thereof as described herein. For example, the process 700 may be performed by a network management unit such as the network management unit 590 described with reference to FIG. 5. In some implementations, the process 700 (or portions thereof) may be performed by a mesh node, such as one of the mesh nodes 210, 212, 218, 410, mesh nodes A-F, mesh node 1300, or mesh node 1700 described with reference to FIGS. 1, 2, 4, 5, 8, 13 and 17, respectively. In some implementations, the process 700 may be performed by a component of the mesh node, such as one of mesh STAs 110, 112, 114, 116, 118 and 122 described with reference to FIG. 1. For brevity, the example process 700 is described as being performed by an apparatus that could be any of the above indicated network management units, mesh nodes, mesh STAs, or a component thereof.

At block 710, the apparatus may collect information from the mesh nodes. For example, the apparatus may perform operations such as those described with reference to blocks 610, 620 and 630 of FIG. 6.

At block 720, the apparatus may select mesh nodes to operate as MU group heads (MU-APs) for MU association groups using MU-MIMO. These mesh nodes may be referred to as MU-MIMO suitable MU-APs. The apparatus may select a first MU group head based on routing topology, traffic patterns, or capacity bottleneck as described with reference to FIGS. 8-10. In the routing topology example, the apparatus may select a first mesh node that has a fewest number of hops to a mesh gate to operate as an MU-AP for an MU association group associated with UL traffic. In the traffic load example, the apparatus may select a first mesh node that has high traffic load to operate as an MU-AP for an MU association group using MU-MIMO. In the capacity bottleneck example, the apparatus may select a first mesh node that exert a highest amount of traffic back pressure to operate as an MU-AP for an MU association group using MU-MIMO.

At block 730, the apparatus may assign mesh nodes to the MU association group based on their peer relationship to the first mesh node in block 720. The ideal MU-STA mesh nodes are those that can use MU-MIMO with the MU-AP selected in block 720. It is noted that the apparatus may refrain from assigning a mesh node to the MU association group if the assignment will exceed its MU participation limitation.

At block 740, the apparatus may determine if there is another MU-MIMO suitable MU-AP that has not exceeded its MU participation constraint. If so, the process 700 may return to block 710 to begin the assignments for another MU association group. If there are no other MU-MIMO suitable MU-APs or they have exceeded their respective MU participation constraints, the process 700 may continue to block 750.

At block 750, the apparatus may select mesh nodes to operate as MU group heads (MU-APs) for MU association groups using OFDMA. These mesh nodes may be referred to as OFDMA suitable MU-APs. The apparatus may select a first mesh node that has a highest number of intermediate hops to MU-STA mesh nodes as a first MU group head.

At block 760, the apparatus may assign mesh nodes to the MU association group based on their peer relationship to the first mesh node in block 750. The ideal MU-STA mesh nodes are those that can use OFDMA with the MU-AP selected in block 750. It is noted that the apparatus may refrain from assigning a mesh node to the MU association group if the assignment will exceed its MU participation limitation.

At block 770, the apparatus may determine if there is another OFDMA suitable MU-AP that has not exceeded its MU participation constraint. If so, the process 700 may return to block 750 to begin the assignments for another MU association group. If there are no other OFDMA suitable MU-APs or they have exceeded their respective MU participation constraints, the process 700 may continue to block 780.

At block 780, the apparatus may inform the mesh nodes of the MU association groups and their assigned role in the MU association groups.

Figure 8:
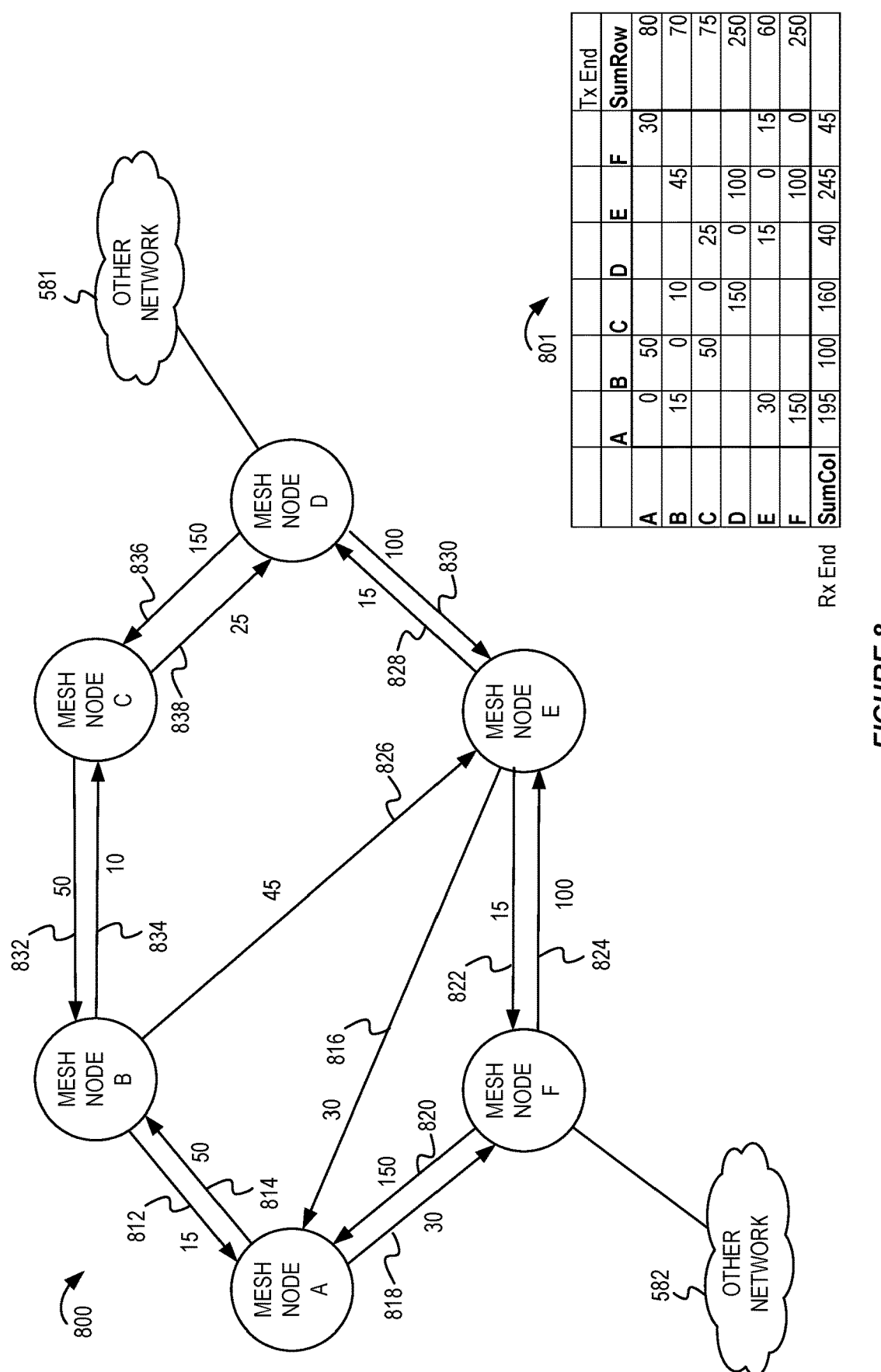
FIG. 8 shows example traffic conditions in an example wireless mesh network and is used to describe different considerations when forming MU association groups.

FIG. 8 shows example traffic conditions in an example wireless mesh network and is used to describe different considerations when forming MU association groups. The topology of the wireless mesh network 800 is the same as described with reference to the wireless mesh network 500 of FIG. 5. FIG. 8 includes example traffic information (such as traffic flow information) regarding each intermediate hop. For example, mesh node A may send outgoing traffic in an intermediate hop 814 to mesh node B. The traffic of intermediate hop 814 may be represented as a metric "50." In some examples in FIG. 8, the metric may represent an amount of traffic, such as 50 Mbps. However, the metric could be based on a weighting or other representation that can comparatively describe the traffic on intermediate hop 814 compared to the other intermediate hops 812, 816, 818, 820, 822, 824, 826, 828, 830, 832, 834, 836 and 838. For brevity, source and destination of each intermediate hop and their respective metrics representing traffic load are consolidated in Table 1 below.

TABLE 1

Summary of intermediate hops

| Drawing reference | Source node | Target node | Traffic load metric (such as Mbps) |
|---|---|---|---|
| intermediate hop 812 | mesh node B | mesh node A | 15 |
| intermediate hop 814 | mesh node A | mesh node B | 50 |
| intermediate hop 816 | mesh node E | mesh node A | 30 |
| intermediate hop 818 | mesh node A | mesh node F | 30 |
| intermediate hop 820 | mesh node F | mesh node A | 150 |
| intermediate hop 822 | mesh node E | mesh node F | 15 |
| intermediate hop 824 | mesh node F | mesh node E | 100 |
| intermediate hop 826 | mesh node B | mesh node E | 45 |
| intermediate hop 828 | mesh node E | mesh node D | 15 |
| intermediate hop 830 | mesh node D | mesh node E | 100 |
| intermediate hop 832 | mesh node C | mesh node B | 50 |
| intermediate hop 834 | mesh node B | mesh node C | 10 |
| intermediate hop 836 | mesh node D | mesh node C | 150 |
| intermediate hop 838 | mesh node C | mesh node D | 25 |

As described with reference to FIG. 5, the wireless mesh network 800 in FIG. 8 includes mesh nodes D and F as ingress/egress points that connect to other networks 581 and 582, respectively. The example traffic load in FIG. 8 suggests that those nodes have a higher amount of outgoing traffic flowing from mesh nodes D and F to their respective peer mesh nodes A, E and C. A chart 801 in FIG. 8 (also reproduced as Table 2 below) includes a summary of the traffic load metrics as a matrix. Each row represents an outgoing (transmit) perspective of the traffic from each mesh node to its peer mesh nodes. Each column represents an incoming (receive) perspective of the traffic that each mesh node receives from its peer mesh nodes.

TABLE 2

Matrix summary of traffic load metrics

|  |  | A | B | C | D | E | F | transmit total SumRow |
|---|---|---|---|---|---|---|---|---|
|  | A | 0 | 50 |  |  |  | 30 | 80 |
|  | B | 15 | 0 | 10 |  | 45 |  | 70 |
|  | C |  | 50 | 0 | 25 |  |  | 75 |
|  | D |  |  | 150 | 0 | 100 |  | 250 |
|  | E | 30 |  |  | 15 | 0 | 15 | 60 |
|  | F | 150 |  |  |  | 100 | 0 | 250 |
| receive total | SumCol | 195 | 100 | 160 | 40 | 245 | 45 |  |

Having described the example traffic in example wireless mesh network 800, the example traffic will be used to describe some example techniques of determining MU association groups.

Traffic-Load Based Example

An apparatus, such as a network management unit or mesh node, may observe the network or collect the traffic information to determine the traffic load metrics such as those described in Table 2. In some implementations, the traffic may be observed at a time that MU association groups are not used, such as during initialization of the MU mesh network configuration, during a configured measurement period, or as part of a reconfiguration time period. In some implementations, the traffic may be observed after an initial assignment of MU association groups have been made. The apparatus may determine MU groups for UL and DL traffic based on the collected traffic information.

As an example of forming MU association groups for DL traffic, the apparatus may group mesh nodes transmitting a high amount of traffic (or above an average or above a threshold) with those mesh nodes in its list of recipients starting from those having the highest weights. For example, mesh nodes D and F may be designated as MU group heads because they both have a highest traffic metric (250) in the table. The designation of MU group heads may be based on those having the largest amount of outgoing traffic or those having the largest number of packets. Using the example in FIG. 8 and Table 2, mesh nodes D and F may be selected as MU group heads for MU association groups supporting DL MU-MIMO. In a first MU association group (for DL MU-MIMO), mesh node D may be the MU group head and mesh nodes C and E may be members. In a second MU association group (for DL MU-MIMO), mesh node F may be the MU group head and mesh nodes A and E may be members.

As an example of forming MU association groups for UL traffic, the apparatus may group mesh nodes receiving a high amount of traffic (or above an average or above a threshold) with those mesh nodes in its list of sources starting from those having the highest weights. For example, mesh nodes A and E may be designated as MU group heads because they both have a highest incoming traffic metrics (245 for mesh node E and 195 for mesh node A) in the table. Thus, in the example in FIG. 8 and Table 2, mesh nodes A and E may be selected as MU group heads to manage UL MU group communications from one or more mesh nodes within the MU association groups supporting UL MU-MIMO. Thus, in a third MU association group (for UL MU-MIMO), mesh node A may be the MU group head and mesh nodes B, E and F may be members because they send traffic to mesh node A. In a fourth MU association group (for UL MU-MIMO), mesh node E may be the MU group head and mesh nodes B, D and F may be members.

Alternatively, or additionally, the formation for MU association groups may be based on quantity of inbound or outbound hops. For example, mesh node B sends traffic to 3 target mesh nodes, which is more than some other mesh nodes that send traffic to 2 target mesh nodes. Thus, the apparatus may form a fifth MU association group (for DL traffic) that include mesh node B as the MU group head and mesh nodes A, C and E as members. Mesh nodes A and E each receive traffic from 3 source mesh nodes. Because mesh nodes A and E were already designated as MU group heads for UL traffic (the third MU association group and fourth MU association group described in the previous paragraph), the apparatus may not create an additional MU association group that would be redundant to one already created. However, if they had not already been designated as an MU group head for UL traffic, the apparatus may create a new MU association group.

As described herein, the formation of MU association groups may be based on the amount of traffic or quantity of inbound or outbound links. Other criterion based on traffic conditions may be used to select MU group heads and designate members of the MU association groups.

Capacity Bottleneck Based Example

Another technique for forming MU association groups may be based on detecting the mesh nodes that are performing at capacity and assigning them as MU group heads for MU association groups supporting MU-MIMO. For example, an apparatus may compare the overall traffic handled by a mesh node with the wireless channel capacity. The capacity may be related to a physical layer (PHY) transmission rate of the wireless channel between the mesh node and a peer mesh node. Formula (1) shows an example calculation to determine effective capacity. In Formula (1), $$effectiveCapacity = \left(PHYRate * \frac{airTimeOxxupied}{totalTimeOfMeasurement}\right) * overheadDiscount \quad (1)$$

the PHYRate indicates the physical layer transmission rate of the wireless channel, airTimeOccupied represents amount of airtime occupied during the total TimeofMeasurement time period, and overheadDiscount may be derived from empirical data and may be used as a tuning factor in the Formula (1).

An apparatus may select mesh nodes to serve as MU group heads based on a comparison of their respective effectiveCapacity and actual utilization. Formula (2) shows an example comparison. In Formula (2), $$effectiveCapacity(i) <= ActualServicedRate(i) \quad (2)$$

the ActualServicedRate may be based on the actual UL or DL traffic measured and i represents an index so that the Formula may be calculated for i mesh nodes.

In addition to Formula (2), other criteria may be used to select MU group heads. For example, Formula (3) includes another criterion that may be used in combination with Formula (1). In Formula (3), $$ChannelIdleTime < ThresholdPercentageOfTotalTime \quad (3)$$

the ChannelIdleTime indicates the amount of time the wireless channel is idle and ThresholdPercentageOfTotalTime may be a threshold parameter. In some implementations, the ThresholdPercentageOfTotalTime may be based on experiments (say 2%) after discounting average expected contention back-off time. ChannelIdleTime may serve as an indicator of activity levels (such as loading) in the mesh network. If ChannelIdleTime is large (such as 5% of the total observation window) and one of the mesh nodes has a capacity bottleneck, the high ChannelIdleTime may be due to bursty traffic that is limited by capacity. The bursty traffic may not normally indicate a capacity bottleneck using Formula (2). By optionally using Formula (3), a potential capacity bottleneck may be discovered. A combination of Formulas (2) and (3) may indicate those mesh nodes which are creating a capacity bottleneck and would benefit from using an MU association group to make a more efficient use of the limited wireless channel resources.

In some implementations, the apparatus may use the number of mesh nodes serviced in addition to the capacity comparison shown in Formulas (1)-(3). For example, the apparatus may select a mesh node as an MU group head when its ActualServicedRate(1)*NumberOfNodesServiced (i) is largest among contending nodes. (referred to as Condition 1). The NumberofNodesServiced(i) may represent the quantity of mesh nodes that are receiving traffic from the $i^{th}$ mesh node.

In some implementations, the apparatus may select MU group heads when Formulas (2) and (3) are true and Condition 1 is satisfied. The designation of members to the MU association groups may be based on their respective peer relationships to those mesh nodes selected as MU group heads.

Weight Based Example

Another technique for forming MU association groups may be based on a weighting to determine mesh nodes that would benefit most from using MU group communication. For example, parameters of the mesh network can be used to identify those mesh nodes that form potential points of bottleneck or high traffic load. In some implementations, the identification of candidate mesh nodes may be performed even without ongoing active traffic in the mesh network. Example parameters that can be used for identifying such mesh nodes may be based on proximity to a mesh portal or based on a routing topology.

A higher weighting value may be given to mesh nodes that are collocated or connected to mesh portal (such as a WAN interface). Similarly, those mesh nodes that are neighboring to a mesh node with a WAN interface can be given higher weights compared to those mesh nodes that are not neighboring a mesh portal. Referring to the example of FIG. 8, mesh nodes D and F may be given the highest weighting value because they are connected to other networks 581 and 582. Mesh nodes A, C and E may be given a weighting value that is lower than mesh nodes D and F but higher than mesh node B because mesh nodes A, C and E are one hop away from mesh nodes D and F. Thus, in some implementations, the weighting value may be based on the number of hops to the mesh portal such that a highest weighting is given to those with the lowest number of hops.

The weighting value may be based on routing topology. Mesh nodes that form a point of traffic routing for a greater number of mesh nodes may be given a higher weighting compared to other mesh nodes that provide traffic routing for a fewer number of mesh nodes. The weighting value for a mesh node may increase in proportion with how many routes are directed to or from that mesh node. In some implementations, the mesh nodes may exchange routing tables or a count of routing entries to determine which mesh nodes provide the higher degree of routing within the mesh network.

Although example weighting considerations are described herein, other parameters may be used to determine a weighting value. For example, the weighting value may be based on routing topology, resource utilization, congestion, processor speed, or number of client STAs serviced, among other examples. After determining a weighting value for the mesh nodes in the mesh network, a network management unit may select those mesh nodes with a higher weighting value as candidate MU group heads.

Figure 9:
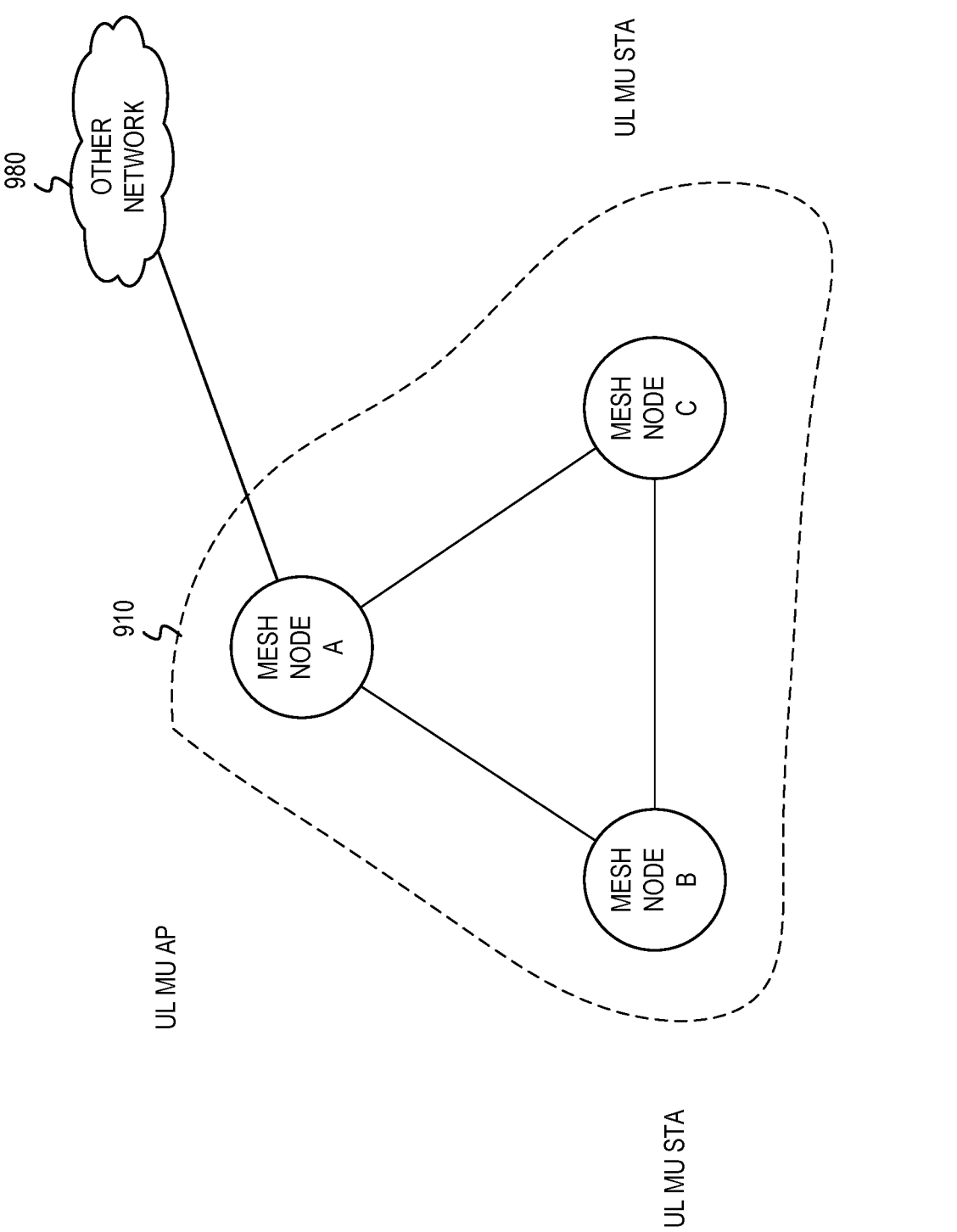
FIG. 9 shows an example wireless mesh network in which MU association groups may be associated with hop count to a mesh gate.

FIG. 9 shows an example wireless mesh network 900 in which MU association groups may be associated with hop count to a mesh gate. The wireless mesh network 900 includes three mesh nodes, labeled as mesh node A, mesh node B, and mesh node C. All of the mesh nodes A, B, and C are peers to one another and can communicate directly with any of the other mesh nodes A, B, and C. Mesh node A has a mesh portal (or mesh gate) to enable communication with another network 980. The wireless mesh network 900 may be referred to as a single hop (or 1-hop) network since each mesh node may have at most one hop to reach the mesh portal at mesh node A.

When forming the MU association groups, a mesh node (or a network management unit) may determine the routing topology such as the hop count from each mesh node A, B, and C to the mesh portal. Because mesh node A has the fewest number of hops (zero) to reach the mesh portal, that mesh node A may be selected as an MU group head (as UL MU-AP) of an MU association group 910 for UL traffic from the peer mesh nodes B and C (as UL MU-STAs). This enables the mesh node A to trigger and receive MU UL group communications from the mesh nodes B and C.

In addition to the MU association group 910 (for UL traffic), there may be one or more other MU association groups (not shown) to support MU DL communications. In some implementations, each mesh node A, B, and C may be an MU group head of an MU association group for DL traffic. For example, mesh node A also may be an MU group head (as MU-AP) for MU DL communication to transmit data to either mesh node B or mesh node C (operating as DL MU-STAs). Mesh node B may be an MU group head (as MU-AP) for MU DL communication to transmit data to either mesh node A or mesh node C (operating as DL MU-STAs). Mesh node C may be an MU group head (as MU-AP) for MU DL communication to transmit data to either mesh node A or mesh node B (operating as DL MU-STAs).

In some implementations, the formation of MU association groups may be constrained to avoid conflicting MU association groups for DL and UL MU communication. For example, a mesh node may include a peer mesh node that has a smaller hop count to the mesh portal in its DL MU communications when particular preconditions are satisfied. Consider the example in FIG. 9 where a transmission from mesh node B to mesh node A could be sent as an UL MU communication (triggered by mesh node A in MU association group 910) or as a DL MU communication (scheduled by mesh node B in a different MU association group). It is preferable to utilize the UL MU communication because mesh node A provides service as the mesh portal for multiple mesh nodes in the wireless mesh network 900. Thus, mesh node B may restrict the use of DL MU communication based on conditions. Example conditions may include when the mesh node A is triggering UL MU communication infrequently (or not frequently enough to satisfy the traffic load), when mesh node B has sufficient traffic for both mesh node A and mesh node C, or a combination of both these conditions.

Furthermore, as described elsewhere, some communications may proceed regardless of the MU association groups. For example, UL OFDMA block acknowledgements or other control frames may be communicated between peer mesh nodes regardless of MU association groups. Single-user acknowledgements or types of data frames may be transmitted or triggered by a peer mesh node separately from MU group communications.

Figure 10:
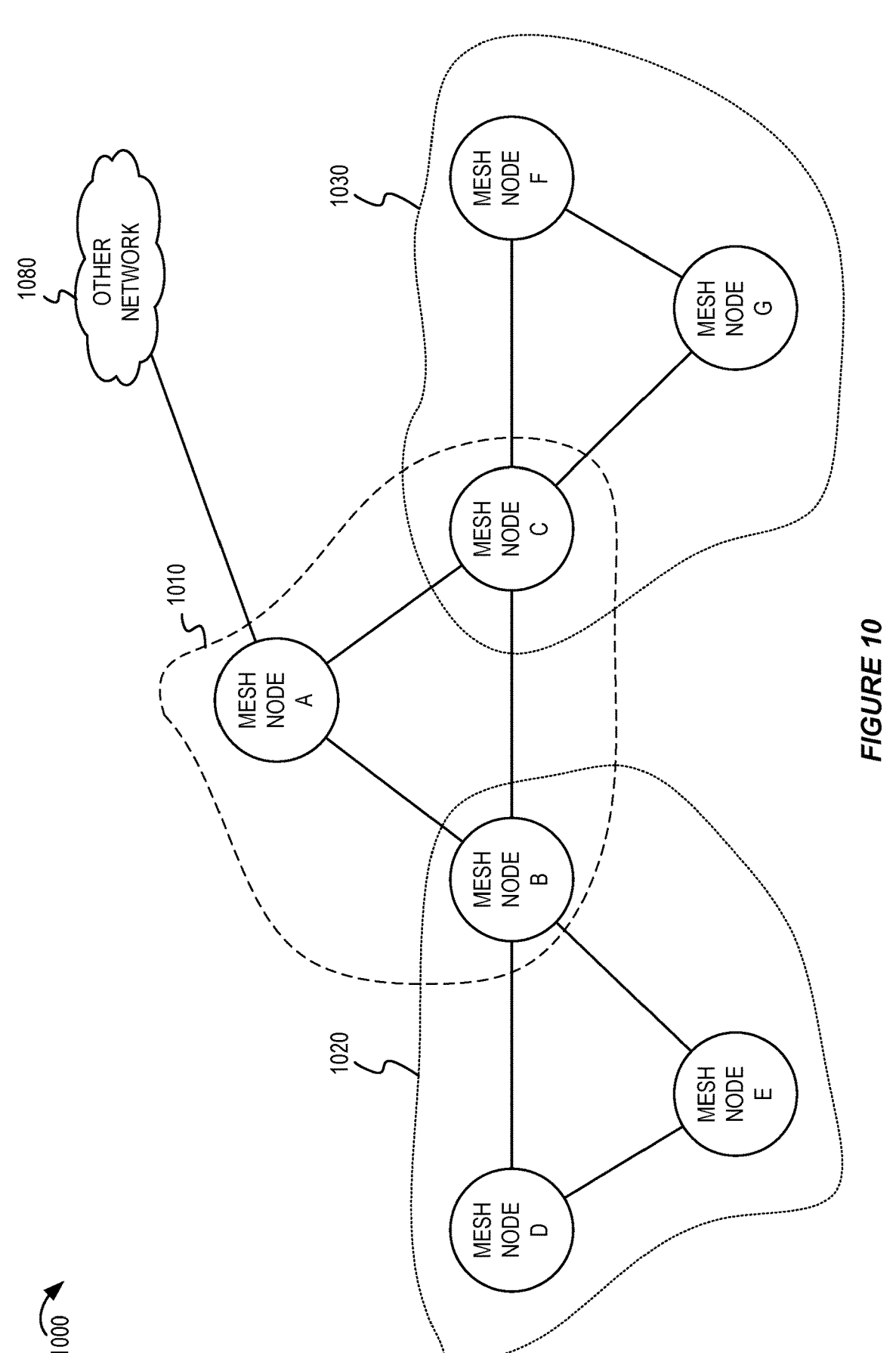
FIG. 10 shows another example wireless mesh network and example MU association groups associated with hop count to a mesh gate.

FIG. 10 shows another example wireless mesh network 1000 and example MU association groups associated with hop count to a mesh gate. The wireless mesh network 1000 includes seven mesh nodes, labeled as mesh node A, mesh node B, mesh node C, mesh node D, mesh node E, mesh node F, and mesh node G. Mesh nodes A, B, and C are peers to one another and can communicate directly with any of the other mesh nodes A, B, and C. Mesh nodes B, D and E are peers to one another and can communicate directly with any of the other mesh nodes B, D and E. Mesh nodes C, G, and F are peers to one another and can communicate directly with any of the other mesh nodes C, G, and F. Mesh node A has a mesh portal (or mesh gate) to enable communication with another network 1080. The wireless mesh network 1000 may be referred to as a multi-hop network since some mesh nodes D, E, F, and G may have more than one hop to reach the mesh portal at mesh node A.

A mesh node (or a network management unit) may determine the routing topology such as the hop count from each mesh node A, B, C, D, E, F, and G to the mesh portal. Because mesh node A has the fewest number of hops (zero) to reach the mesh portal, that mesh node A may be selected as an MU group head (as UL MU-AP) of a first MU association group 1010 for UL traffic from the peer mesh nodes B and C (as UL MU-STAs). Continuing with the mesh nodes having the fewest number of hops to the mesh portal, mesh nodes B and C also may be selected as MU group heads for a second MU association group 1020 and a third MU association group 1030, respectively. The example MU association groups 1010, 1020, and 1030 are designated for UL MU communications such at the respective MU group heads (mesh nodes A, B, and C, respectively) can trigger and receive UL MU communication from the peer mesh nodes in their respective MU association groups 1010, 1020 and 1030.

In addition to the MU association groups 1010, 1020, and 1030 (for UL traffic), there may be one or more other MU association groups (not shown) to support MU DL communications. In some implementations, each mesh node A, B, C, D, E, F, and G may be an MU group head of an MU association group for DL traffic to their respective peer mesh nodes. The same constraints described with reference to FIG. 9 may be used to determine whether to use a DL MU association group versus an UL MU association group when two nodes are members of overlapping UL and DL MU association groups.

Occasionally a routing topology of a wireless mesh network may change, such as when a new mesh node joins the wireless mesh network or when an existing mesh node leaves the wireless mesh network. Each mesh node may determine its hop count to the mesh portal and the respective hop counts of each peer mesh node to the mesh portal. For example, each mesh node may indicate its hop count using discovery or announcement messages (such as those defined in the IEEE 1905 specification). A mesh node may determine which of its peer mesh nodes has the fewest number of hops to the mesh portal and select that peer mesh node as its UL MU-AP. In some implementations, the mesh node may transmit a message to the selected UL MU-AP to request to join an UL MU association group in which that UL MU-AP is the MU group head. The selected UL MU-AP may approve the request to join the UL MU association group and send a confirmation message to the mesh node that it is in the UL MU association group managed by that UL MU-AP. In some implementations, each mesh node may select a single peer mesh node as its UL MU-AP so that traffic through the UL MU association groups can be optimized through the wireless mesh network.

Figure 11:
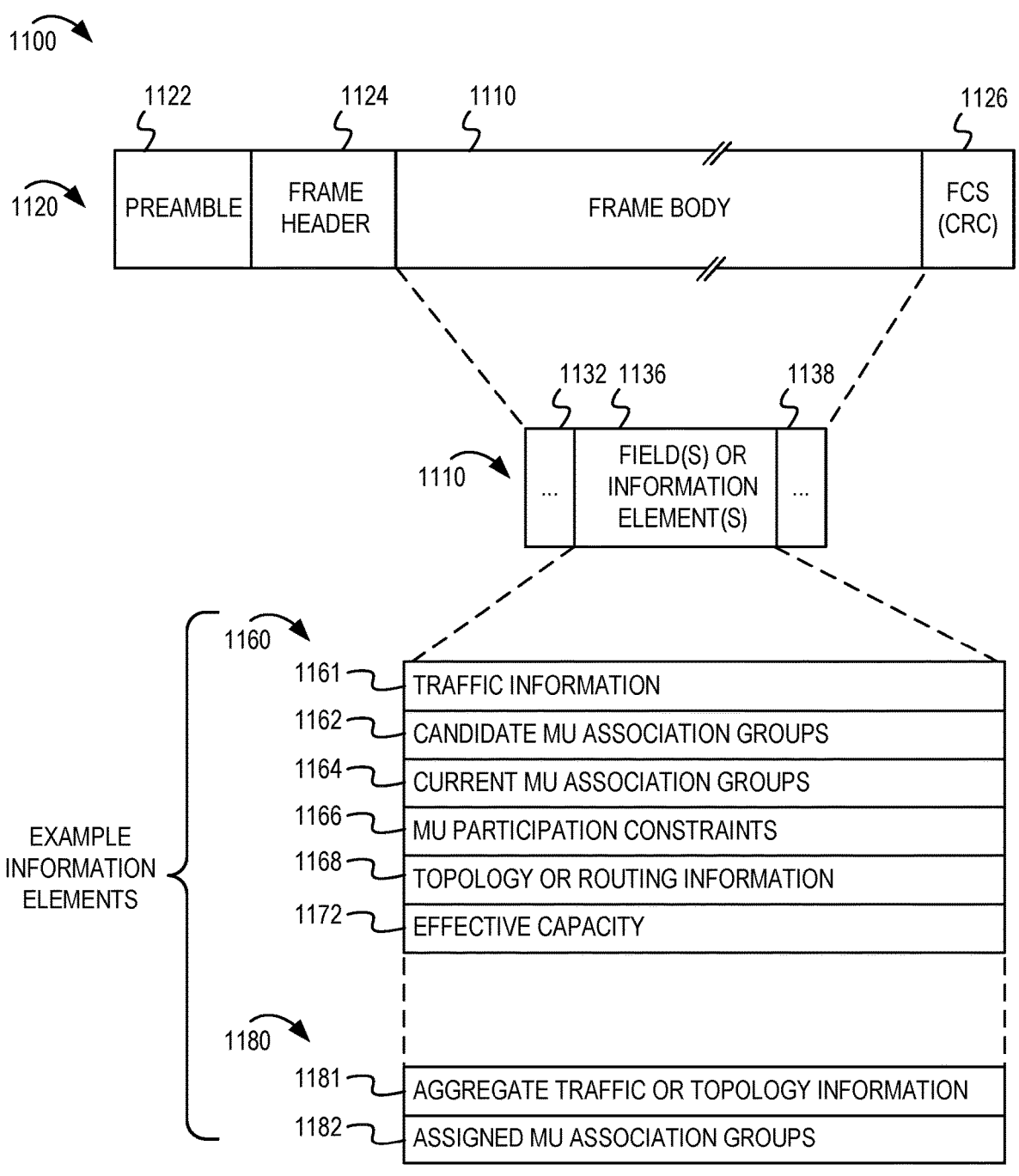
FIG. 11 shows a conceptual diagram of an example MU association group setup or configuration message.

FIG. 11 shows a conceptual diagram of an example MU association group setup or configuration message 1100. For example, the message may be an example of a MU association group setup or configuration message 1100 transmitted from a mesh node to another mesh node or to a network management unit. The message may be an example of a MU association group setup or configuration message 1100 transmitted from a network management unit to a mesh node. The message format may depend on the transmitter and the recipient of the message. Different fields or information elements may be included in a frame body 1110 of the MU association group setup or configuration message 1100 at various stages of organizing the MU association groups.

The MU association group setup or configuration message 1100 may be used to communicate parameters that can be used to determine MU association groups in a wireless mesh network. FIG. 11 includes an example data frame 1120. The data frame 1120 may include a preamble 1122, a frame header 1124, a frame body 1110, and a frame check sequence (FCS) 1126. The preamble 1122 may include one or more bits to establish synchronization. The frame header 1124 may include source and destination network addresses (such as the network address of a mesh node or network management unit), the length of data frame, or other frame control information. The frame body 1110 may be organized with a message format and may include a variety of fields or information elements 1132, 1136 and 1138. In some implementations, the data frame 1120 may be an IEEE 802.11s configuration frame, a management frame, an IEEE 1905 policy configuration message, or an IEEE 802.11k message, among other examples.

Example information elements are shown in FIG. 11. Some example information elements 1160 may be included in a report message from a mesh node to another mesh node or to a network management unit. The example information elements 1160 may include traffic information 1161, candidate MU association groups 1162, current MU association groups 1164, MU participation constraints 1166, topology or routing information 1168, or an effective capacity 1172. For example, the effective capacity 1172 may be calculated by each mesh node according to example Formula (1) and reported to the network management unit.

Some example information elements 1180 may be included in a control message from network management unit to a mesh node. The example information elements 1180 may include aggregate traffic or topology information 1181 to assist the mesh nodes to determine candidate MU association groups. The example information elements 1180 may include MU group assignments 1182. The MU group assignments 1182 may be sent to all mesh nodes in the wireless mesh network or may be sent to those mesh nodes which have been assigned to an MU association group in the MU group assignments 1182. The MU group assignments 1182 may indicate the MU technology type (OFDMA or MU-MIMO), the MU group head, and a list of members in each MU association group.

Figure 12:
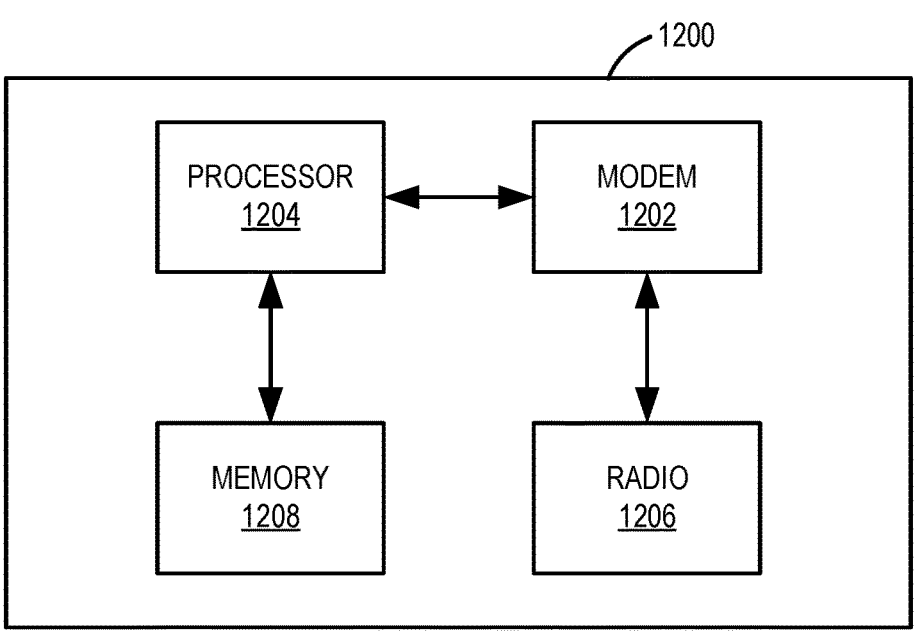
FIG. 12 shows a block diagram of an example wireless communication device.

FIG. 12 shows a block diagram of an example wireless communication device 1200. In some implementations, the wireless communication device 1200 can be an example of a device for use in a mesh node such as any of the mesh STAs 110, 112, 114, 116, 118, 122, 210, 212, 218 and 410 described with reference to FIGS. 1, 2 and 4, respectively, or any of the mesh nodes A-F described with reference to FIGS. 5 and 8. The wireless communication device 1200 is capable of transmitting and receiving wireless communications in the form of, for example, wireless packets. For example, the wireless communication device can be configured to transmit and receive packets in the form of physical layer convergence protocol (PLCP) protocol data units (PP-DUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11s, 802.11ay, 802.11ax, 802.11az, 802.11ba and 802.11be.

The wireless communication device 1200 can be, or can include, a chip, system on chip (SoC), chipset, package or device that includes one or more modems 1202, for example, a Wi-Fi (IEEE 802.11 compliant) modem. In some implementations, the one or more modems (collectively "the modem 1202") additionally include a WWAN modem (for example, a 3GPP 4G LTE or 5G compliant modem). In some implementations, the wireless communication device 1200 also includes a processing system. The processing system also may be referred to as the processor 1204 and may include one or more processors, processing blocks or processing elements coupled with the modem 1202, as well as one or more memories, memory blocks or memory elements. In some implementations, the wireless communication device 1200 additionally includes one or more radios (collectively "the radio 1206") coupled with the modem 1202. In some implementations, the wireless communication device 1200 further includes one or more memory blocks or elements (collectively "the memory 1208") coupled with the processor 1204 or the modem 1202.

The modem 1202 can include an intelligent hardware block or device such as, for example, an application-specific integrated circuit (ASIC), among other examples. The modem 1202 is generally configured to implement a PHY layer, and in some implementations, also a portion of a MAC layer (for example, a hardware portion of the MAC layer). For example, the modem 1202 is configured to modulate packets and to output the modulated packets to the radio 1206 for transmission over the wireless medium. The modem 1202 is similarly configured to obtain modulated packets received by the radio 1206 and to demodulate the packets to provide demodulated packets. In addition to a modulator and a demodulator, the modem 1202 may further include digital signal processing (DSP) circuitry, automatic gain control (AGC) circuitry, a coder, a decoder, a multiplexer and a demultiplexer. For example, while in a transmission mode, data obtained from the processor 1204 may be provided to an encoder, which encodes the data to provide coded bits. The coded bits may be mapped to a number $N_{SS}$ of spatial streams for spatial multiplexing or a number $N_{STS}$ of space-time streams for space-time block coding (STBC). The coded bits in the streams may be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may be provided to a digital-to-analog converter (DAC). The resultant analog signals may be provided to a frequency upconverter, and ultimately, the radio 1206. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 1206, for example, by detecting the presence of the signal and estimating the initial timing and frequency offsets. The DSP circuitry is further configured to digitally condition the signal, for example, using channel (narrowband) filtering and analog impairment conditioning (such as correcting for I/Q imbalance), and by applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may be descrambled and provided to the MAC layer (the processor 1204) for processing, evaluation or interpretation.

The radio 1206 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some implementations, the wireless communication device 1200 can include, or be coupled with, multiple transmit antennas (each with a corresponding transmit chain) and multiple receive antennas (each with a corresponding receive chain). The symbols output from the modem 1202 are provided to the radio 1206, which transmits the symbols via the coupled antennas. Similarly, symbols received via the antennas are obtained by the radio 1206, which provides the symbols to the modem 1202.

The processor 1204 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 1204 processes information received through the radio 1206 and the modem 1202, and processes information to be output through the modem 1202 and the radio 1206 for transmission through the wireless medium. For example, the processor 1204 may implement a control plane and at least a portion of a MAC layer configured to perform various operations related to the generation, transmission, reception and processing of MPDUs, frames or packets. In some implementations, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some implementations, the processor 1204 may generally control the modem 1202 to cause the modem to perform various operations described above.

The memory 1208 can include tangible storage media such as random-access memory (RAM) or read-only memory (ROM), or combinations thereof. The memory 1208 also can store non-transitory processor- or computer-executable software (SW) code containing instructions that, when executed by the processor 1204, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 13:
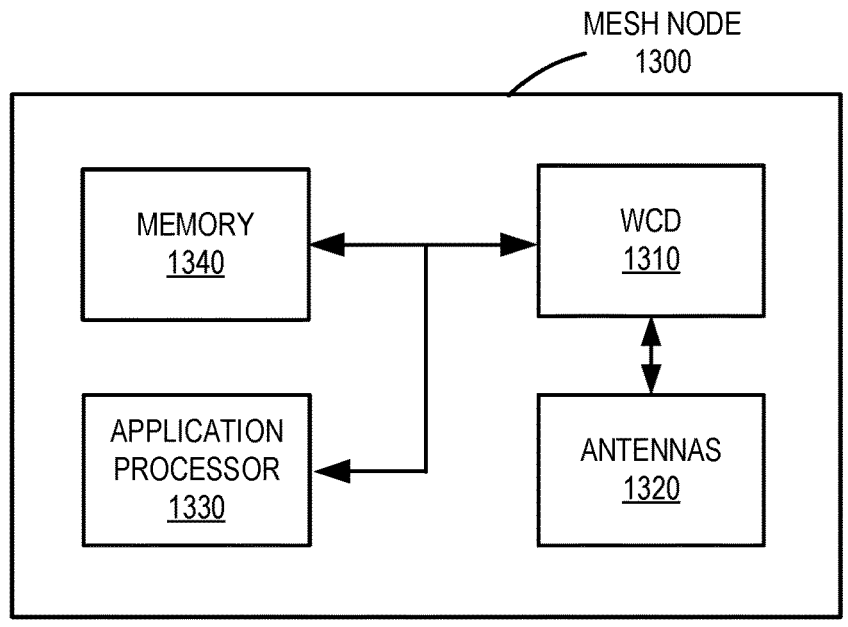
FIG. 13 shows a block diagram of an example mesh node.

FIG. 13 shows a block diagram of an example mesh node 1300. In some implementations, the example mesh node 1300 can be an example of a mesh node such as any of the mesh STAB 110, 112, 114, 116, 118, 122 and 214 or any of the mesh nodes 210, 212, 218, 410, 420 and 440 described with reference to FIGS. 1, 2 and 4, respectively, or any of the mesh nodes A-F described with reference to FIGS. 5 and 8. The mesh node 1300 includes a wireless communication device (WCD) 1310 (although the mesh node 1300 may itself also be referred to generally as a wireless communication device as used herein). For example, the wireless communication device 1310 may be an example implementation of the wireless communication device 1200 described with reference to FIG. 12. The mesh node 1300 also may include multiple antennas 1320 coupled with the wireless communication device 1310 to transmit and receive wireless communications. In some implementations, the mesh node 1300 additionally includes an application processor 1330 coupled with the wireless communication device 1310, and a memory 1340 coupled with the application processor 1330.

In some implementations, the mesh node 1300 may include an external network interface (not shown) that enables the mesh node 1300 to communicate with a core network or backhaul network to gain access to external networks including the Internet. For example, the external network interface may include one or both of a wired (for example, Ethernet) network interface and a wireless network interface (such as a WWAN interface). Ones of the aforementioned components can communicate with other ones of the components directly or indirectly, over at least one bus. The mesh node 1300 further includes a housing that encompasses the wireless communication device 1310, the application processor 1330, the memory 1340, and at least portions of the antennas 1320.

FIG. 14 shows a flowchart illustrating an example process 1400 for a network management unit that enables MU group communication in a wireless mesh network. The operations of the process 1400 may be implemented by a network management unit, a mesh node, a centralized resource or any component thereof as described herein. For example, the process 1400 may be performed by a network management unit such as the network management unit 590 described with reference to FIG. 5. In some implementations, the process 1400 (or portions thereof) may be performed by a mesh node, such as one of the mesh nodes 210, 212, 218, 410, mesh nodes A-F, mesh node 1300, or mesh node 1700 described with reference to FIGS. 1, 2, 4, 5, 8, 13 and 17, respectively. In some implementations, the process 1400 may be performed by a component of the mesh node, such as one of mesh STAs 110, 112, 114, 116, 118 and 122 described with reference to FIG. 1. For brevity, the example process 1400 is described as being performed by an apparatus that could be any of the above indicated network management units, mesh nodes, mesh STAs, or a component thereof.

In block 1410, the apparatus may communicate in a wireless mesh network that includes a plurality of mesh nodes. In block 1420, the apparatus may establish at least a first multi-user (MU) association group that includes a first mesh node and one or more peer mesh nodes of the plurality of mesh nodes. The first MU association group may enable the first mesh node as an MU group head to allocate wireless channel resources for MU communication between the first mesh node and at least a subset of the one or more peer mesh nodes that form the first MU association group.

FIG. 15 shows a flowchart illustrating another example process 1500 for a mesh node that supports MU group communication in a wireless mesh network. The operations of the process 1500 may be implemented by a mesh node or any component thereof as described herein. For example, the process 1500 may be performed by any of the mesh nodes 210, 212, 218, 410, mesh nodes A-F, mesh node 1300, or mesh node 1700 described with reference to FIGS. 1, 2, 4, 5, 8, 13 and 17, respectively. In some implementations, the process 1500 may be performed by a component of the mesh node, such as one of mesh STAs 110, 112, 114, 116, 118 and 122 described with reference to FIG. 1. For brevity, the example process 1500 is described as being performed by an apparatus that could be any of the above indicated mesh nodes, mesh STAs, or a component thereof.

In block 1510, the apparatus may operate as a multi-user (MU) group head of a first MU association group that includes the apparatus (a first mesh node) and one or more peer mesh nodes in the wireless mesh network. In block 1520, the apparatus may allocate wireless channel resources for an MU group communication between the first mesh node and at least a subset of the one or more peer mesh nodes that form the first MU association group.

FIG. 16 shows a flowchart illustrating another example process 1600 for a mesh node that supports MU group communication in a wireless mesh network. The operations of the process 1600 may be implemented by a mesh node or any component thereof as described herein. For example, the process 1600 may be performed by any of the mesh nodes 210, 212, 218, 410, mesh nodes A-F, mesh node 1300, or mesh node 1700 described with reference to FIGS. 1, 2, 4, 5, 8, 13 and 17, respectively. In some implementations, the process 1600 may be performed by a component of the mesh node, such as one of mesh STAs 110, 112, 114, 116, 118 and 122 described with reference to FIG. 1. For brevity, the example process 1600 is described as being performed by an apparatus that could be any of the above indicated mesh nodes, mesh STAs, or a component thereof.

In block 1610, the apparatus may communicate in a wireless mesh network with a plurality of mesh nodes. In block 1620, the apparatus may receive a configuration for at least a first multi-user (MU) association group that includes a second mesh node as an MU group head and at least the first mesh node. In block 1630, the apparatus may transmit part of a first MU group communication to the second mesh node using wireless channel resources managed by the second mesh node, the first MU group communication including transmissions from one or more mesh nodes.

Figure 17:
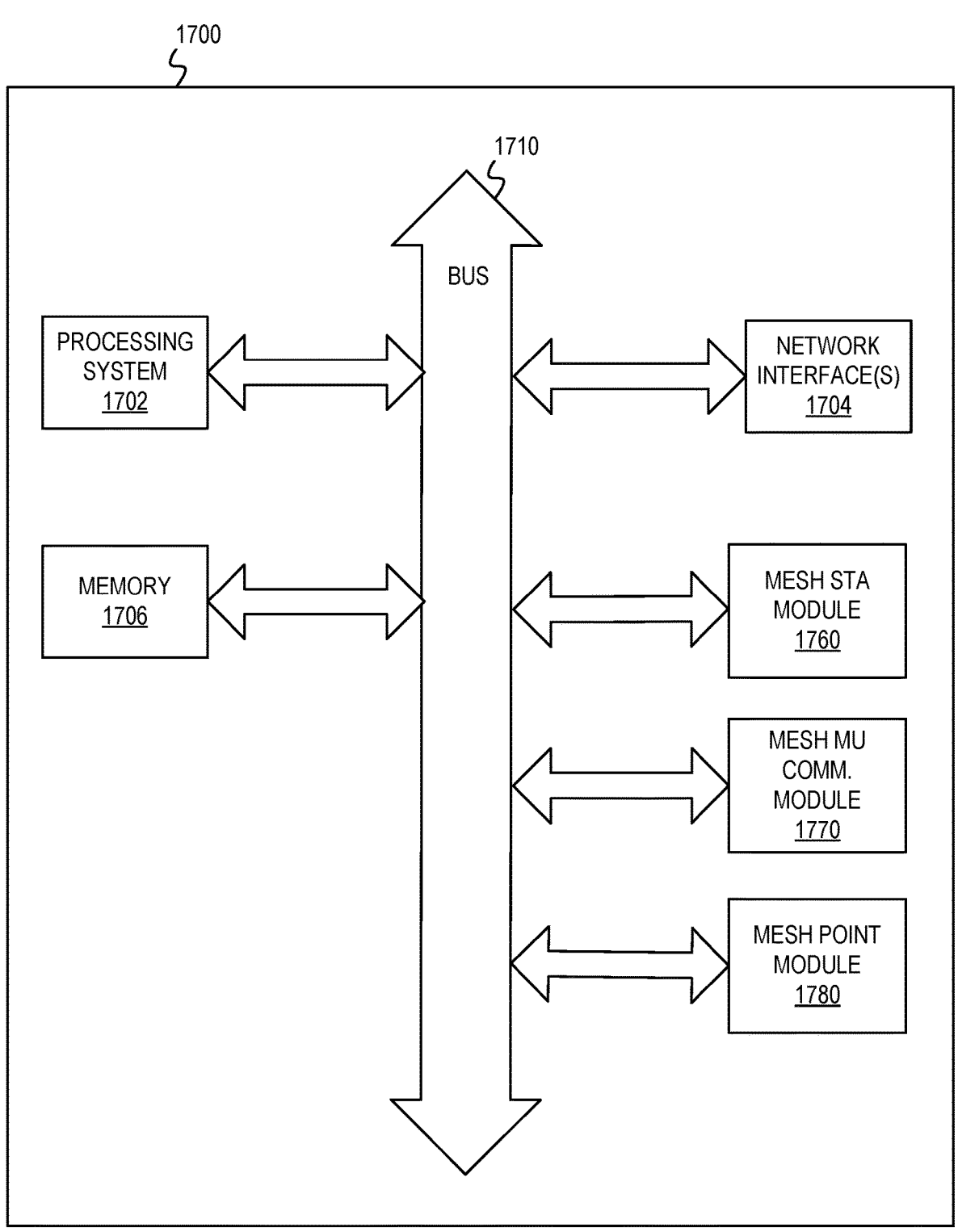
FIG. 17 shows a block diagram of an example electronic device for implementing aspects of this disclosure.

FIG. 17 shows a block diagram of an example electronic device for implementing aspects of this disclosure. In some implementations, the electronic device 1700 may be a WLAN device, including any of the WLAN devices described herein. The electronic device 1700 can include a processing system 1702 (possibly including a single processor, multiple processors, multiple cores, multiple nodes, or implementing multi-threading, etc.). The electronic device 1700 also can include a memory 1706. The memory 1706 may be system memory or any one or more of the possible realizations of computer-readable media described herein. In some implementations, the processing system 1702 can include the memory 1706. The electronic device 1700 also can include a bus 1710 (such as PCI, ISA, PCI-Express, HyperTransport®, InfiniBand®, NuBus®, AHB, AXI, etc.), and a network interface 1704 that can include at least one of a wireless network interface (such as a WLAN interface, a Bluetooth® interface, a WiMAX® interface, a ZigBee® interface, a Wireless USB interface, etc.) and a wired network interface (such as an Ethernet interface, a powerline communication interface, etc.). In some implementations, the electronic device 1700 may support multiple network interfaces—each of which is configured to couple the electronic device 1700 to a different communication network.

The electronic device 1700 may include a mesh STA module 1760 configured to establish or join an MBSS with peer mesh nodes. The electronic device 1700 may include a mesh MU communication module 1770 configured to operate a network management function or communicate with another mesh node that operates an external network management function. The mesh MU communication module 1770 may determine MU association groups or may provide information to an external network management function to aid in the determination of MU association groups. In some implementations, the electronic device 1700 may include a mesh point module 1780. The mesh point module 1780 may be configured to establish an IBSS and operate as an access point for non-mesh STAs in the IBSS. The mesh point module 1780 may include a mesh gate or other functionality to translate communications between the MBSS and the IBSS. Although illustrated as separate components, the mesh STA module 1760, mesh MU communication module 1770, the mesh point module 1780, or any combination thereof, may be implemented within the network interface 1704, the memory 1706, or the processing system 1702.

The memory 1706 can include computer instructions executable by the processing system 1702 to implement the functionality of the implementations described in FIGS. 1-16. Any of these functionalities may be partially (or entirely) implemented in hardware or on the processing system 1702. For example, the functionality may be implemented with an application specific integrated circuit, in logic implemented in the processing system 1702, in a co-processor on a peripheral device or card, among other examples. Further, realizations may include fewer or additional components not illustrated in FIG. 15 (such as video cards, audio cards, additional network interfaces, peripheral devices, etc.). The processing system 1702, the memory 1706, and the network interface 1704 are coupled to the bus 1710. Although illustrated as being coupled to the bus 1710, the memory 1706 may be coupled to the processing system 1702.

FIGS. 1-17 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options (enumerated as clauses for clarity).

Clause 1. A method for wireless communication, including: communicating in a wireless mesh network that includes a plurality of mesh nodes; and establishing at least a first multi-user (MU) association group that includes a first mesh node and one or more peer mesh nodes of the plurality of mesh nodes, the first MU association group enabling the first mesh node as an MU group head to allocate wireless channel resources for MU communication between the first mesh node and at least a subset of the one or more peer mesh nodes that form the first MU association group.

Clause 2. The method of clause 1, where establishing the at least first MU association group includes transmitting an indication to the one or more peer mesh nodes regarding their roles as members of the first MU association group.

Clause 3. The method of any one of clauses 1-2, where establishing the at least first MU association group includes selecting the first mesh node as the MU group head of the first MU association group based on a routing topology of the wireless mesh network.

Clause 4. The method of clause 3, where establishing the at least first MU association group further includes: selecting the first mesh node as the MU group head to manage the first MU association group based on the routing topology and traffic flow information; and selecting the one or more peer mesh nodes as members of the first MU association group based on their respective peer relationship with the first mesh node.

Clause 5. The method of clause 4, where establishing the at least first MU association group further includes: obtaining the routing topology of the wireless mesh network based on path selection protocol messages; and obtaining traffic flow information regarding traffic between the first mesh node and the one or more peer mesh nodes.

Clause 6. The method of clause 5, where obtaining the traffic flow information includes: sending a request for a traffic report message to each of the one or more peer mesh nodes; and receiving the traffic report message from each of the one or more peer mesh nodes in response to the request, the traffic report message including the traffic flow information measured by each of the one or more peer mesh nodes.

Clause 7. The method of any one of clauses 3-6, where selecting the first mesh node as the MU group head includes: selecting the first mesh node as the MU group head of the first MU association group based on at least one condition from a group consisting of: a determination that the first mesh node has a highest traffic load from among the plurality of mesh nodes not already assigned as an MU group head, a determination that the first mesh node produces a highest capacity bottleneck in the wireless mesh network from among the plurality of mesh nodes not already assigned as an MU group head, a determination that the first mesh node receives traffic from a highest quantity of source mesh nodes from among the plurality of mesh nodes not already assigned as an MU group head, a determination that the first mesh node has a highest weighting value among weighting values for the plurality of mesh nodes, and any combination thereof.

Clause 8. The method of any one of clauses 3-6, where selecting the first mesh node as the MU group head includes: selecting the first mesh node as the MU group head of the first MU association group based on at least one condition from a group consisting of: the first mesh node having a lowest quantity of hops to a mesh portal as compared to quantities of hops between each of the plurality of mesh nodes and the mesh portal, the first mesh node having a highest quantity of inbound or outbound routes as compared to quantities of inbound or output routes for each of the plurality of mesh nodes in a routing table for the wireless mesh network, and a weighted combination thereof.

Clause 9. The method of any one of clauses 1-8, further including: receiving, from various mesh nodes of the wireless mesh network, candidate MU association groups determined by the various mesh nodes; and selecting the first mesh node as the MU group head of the first MU association group based on the candidate MU association groups.

Clause 10. The method of any one of clauses 1-9, further including: determining a plurality of MU association groups based on traffic flow information and a routing topology of the wireless mesh network, each MU association group having a respective MU group head and one or more respective member mesh nodes.

Clause 11. The method of any one of clauses 1-10, further including: determining MU participation constraints for each of the plurality of mesh nodes, the MU participation constraints limiting a quantity of mesh nodes that the mesh node can manage as an MU group head or limiting a quantity of MU association groups in which the mesh node can participate as a member; and selecting the plurality of MU association groups based on the MU participation constraints for each of the plurality of mesh nodes.

Clause 12. The method of any one of clauses 1-11, where the first mesh node operates as, or is collocated with, a network management unit of the wireless mesh network.

Clause 13. A method for wireless communication by a first mesh node of a wireless mesh network, including: operating as a multi-user (MU) group head of a first MU association group that includes the first mesh node and one or more peer mesh nodes in the wireless mesh network; and allocating, by the first mesh node, wireless channel resources for an MU group communication between the first mesh node and at least a subset of the one or more peer mesh nodes that form the first MU association group.

Clause 14. The method of clause 13, where managing the wireless channel resources includes allocating the wireless channel resources based on a multi-user communication technology that is different from a wireless mesh network protocol.

Clause 15. The method of any one of clauses 13-14, where managing the wireless channel resources includes: transmitting the MU group communication from the first mesh node to the at least the subset of the one or more peer mesh nodes, the MU group communication including concurrent downlink transmission of distinct data for each of the at least the subset of the one or more peer mesh nodes.

Clause 16. The method of any one of clauses 13-15, where managing the wireless channel resources includes: allocating the wireless channel resources to the at least the subset of the one or more peer mesh nodes in which to concurrently receive uplink transmissions of distinct data from each of the at least the subset of the one or more peer mesh nodes; and receiving the MU group communication having the distinct data via the allocated wireless channel resources corresponding to each of the at least the subset of the one or more peer mesh nodes.

Clause 17. The method of any one of clauses 13-16, further including: formatting the MU group communication between the first mesh node and the subset of the one or more peer mesh nodes as a MU multiple-input-multiple-output (MU-MIMO) transmission or an orthogonal frequency division multiple access (OFDMA) transmission.

Clause 18. The method of clause 17, where the MU group communication is the MU-MIMO transmission when a traffic type of the first MU association group is capacity sensitive, and where the MU group communication is the OFDMA transmission when the traffic type of the first MU association group is latency sensitive.

Clause 19. A method performed by a first mesh node of a wireless mesh network, including: communicating in the wireless mesh network with a plurality of mesh nodes; receiving a configuration for at least a first multi-user (MU) association group that includes a second mesh node as an MU group head and at least the first mesh node; and transmitting part of a first MU group communication to the second mesh node using wireless channel resources managed by the second mesh node, the first MU group communication including transmissions from one or more mesh nodes.

Clause 20. The method of clause 19, further including: receiving, from a network management unit, a request for a traffic report message; and sending the traffic report message to the network management unit in response to the request, the traffic report message including the traffic flow information measured by the first mesh node and usable by the network management unit to assign the first mesh node to the first MU association group.

Clause 21. The method of any one of clauses 19-20, further including: sending, from the first mesh node to a network management unit, one or more candidate MU association groups based on traffic flow information and a routing topology of the wireless mesh network, where the configuration for the first MU association group is based on the one or more candidate MU association groups.

Clause 22. The method of any one of clauses 19-21, further including: receiving a configuration for a second MU association group that includes the first mesh node; communicating traffic associated the first MU association group via the first MU group communication using wireless channel resources managed by the second mesh node; and communicating traffic associated with the second MU association group via a second MU group communication using wireless channel resources managed by an MU group head for the second MU association group.

Clause 23. The method of clause 22, where the first mesh node is the MU group head for the second MU association group, the method further including: managing, by the first mesh node as the MU group head of the second MU association group, wireless channel resources associated with the second MU group communication between the first mesh node and one or more peer mesh nodes in the second MU association group.

Clause 24. A first mesh node, including: at least one modem configured to communicate in a wireless mesh network that includes a plurality of mesh nodes; and processing system configured to establish at least a first multi-user (MU) association group that includes the first mesh node and one or more peer mesh nodes of the plurality of mesh nodes, the first MU association group enabling the first mesh node as an MU group head to allocate wireless channel resources for MU communication between the first mesh node and at least a subset of the one or more peer mesh nodes that form the first MU association group.

Clause 25. The first mesh node of clause 24, where the at least one modem is configured to output an indication for transmission to the one or more peer mesh nodes regarding their roles as members of the first MU association group.

Clause 26. The first mesh node of any one of clauses 24-25, where the processing system is configured to select the first mesh node as the MU group head of the first MU association group based on a routing topology of the wireless mesh network.

Clause 27. The first mesh node of clause 26, where the processing system is further configured to: select the first mesh node as the MU group head to manage the first MU association group based on the routing topology and the traffic flow information; and select the one or more peer mesh nodes as members of the first MU association group based on their respective peer relationship with the first mesh node.

Clause 28. The first mesh node of clause 27, where the processing system is further configured to: obtain the routing topology of the wireless mesh network based on path selection protocol messages obtained by the at least one modem; and determine traffic flow information regarding traffic between the first mesh node and the one or more peer mesh nodes.

Clause 29. The first mesh node of clause 28, where the at least one modem is configured to: output a request for a traffic report message to each of the one or more peer mesh nodes; and obtain the traffic report message from each of the one or more peer mesh nodes in response to the request, the traffic report message including the traffic flow information measured by each of the one or more peer mesh nodes.

Clause 30. The first mesh node of any one of clauses 26-29, where the processing system is configured to select the first mesh node as the MU group head of the first MU association group based on at least one condition from a group consisting of: a determination that the first mesh node has a highest traffic load from among the plurality of mesh nodes not already assigned as an MU group head, a determination that the first mesh node produces a highest capacity bottleneck in the wireless mesh network from among the plurality of mesh nodes not already assigned as an MU group head, a determination that the first mesh node receives traffic from a highest quantity of source mesh nodes from among the plurality of mesh nodes not already assigned as an MU group head, a determination that the first mesh node has a highest weighting value among weighting values for the plurality of mesh nodes, and any combination thereof.

Clause 31. The first mesh node of clauses 26-29, where the processing system is configured to select the first mesh node as the MU group head of the first MU association group based on at least one condition from a group consisting of: the first mesh node having a lowest quantity of hops to a mesh portal as compared to quantities of hops between each of the plurality of mesh nodes and the mesh portal, the first mesh node having a highest quantity of inbound or outbound routes as compared to quantities of inbound or output routes for each of the plurality of mesh nodes in a routing table for the wireless mesh network, and a weighted combination thereof.

Clause 32. The first mesh node of any one of clauses 24-31, where the at least one modem is configured to obtain, from various mesh nodes of the wireless mesh network, candidate MU association groups determined by the various mesh nodes; and where the processing system is configured to select the first mesh node as the MU group head of the first MU association group based on the candidate MU association groups.

Clause 33. The first mesh node of any one of clauses 24-32, where the processing system is configured to determine a plurality of MU association groups based on traffic flow information and a routing topology of the wireless mesh network, each MU association group having a respective MU group head and one or more respective member mesh nodes.

Clause 34. The first mesh node of any one of clauses 24-33, where the processing system is configured to: determine MU participation constraints for each of the plurality of mesh nodes, the MU participation constraints limiting a quantity of mesh nodes that the mesh node can manage as an MU group head or limiting a quantity of MU association groups in which the mesh node can participate as a member; and select the plurality of MU association groups based on the MU participation constraints for each of the plurality of mesh nodes.

Clause 35. The first mesh node of any one of clauses 24-34, where the first mesh node operates as, or is collocated with, a network management unit of the wireless mesh network.

Clause 36. The first mesh node of any one of clauses 24-35, further including: at least one transceiver coupled to the at least one modem; at least one antenna coupled to the at least one transceiver to wirelessly transmit signals output from the at least one transceiver and to wirelessly receive signals for input into the at least one transceiver; and a housing that encompasses at least the processing system, the at least one modem, the at least one transceiver, and at least a portion of the at least one antenna.

Clause 37. A first mesh node, including: at least one modem configured to operate as a multi-user (MU) group head of a first MU association group that includes the first mesh node and one or more peer mesh nodes in the wireless mesh network; and processing system configured to allocate wireless channel resources for an MU group communication between the first mesh node and at least a subset of the one or more peer mesh nodes that form the first MU association group.

Clause 38. The method of clause 37, where the processing system is configured to allocate the wireless channel resources based on a multi-user communication technology that is different from a wireless mesh network protocol.

Clause 39. The first mesh node of any one of clauses 37-38, where the at least one modem is configured to output the MU group communication from the first mesh node to the at least the subset of the one or more peer mesh nodes, the MU group communication including concurrent downlink transmission of distinct data for each of the at least the subset of the one or more peer mesh nodes.

Clause 40. The first mesh node of any one of clauses 37-39, where the processing system is configured to allocate the wireless channel resources to the at least the subset of the one or more peer mesh nodes in which to concurrently receive uplink transmissions of distinct data from each of the at least the subset of the one or more peer mesh nodes; and where the at least one modem is configured to obtain the MU group communication having the distinct data via the allocated wireless channel resources corresponding to each of the at least the subset of the one or more peer mesh nodes.

Clause 41. The first mesh node of any one of clauses 37-40, where the at least one modem is configured to format the MU group communication between the first mesh node and the subset of the one or more peer mesh nodes as a MU multiple-input-multiple-output (MU-MIMO) transmission or an orthogonal frequency division multiple access (OFDMA) transmission.

Clause 42. The first mesh node of clause 41, where the MU group communication is the MU-MIMO transmission when a traffic type of the first MU association group is capacity sensitive, and where the MU group communication is the OFDMA transmission when the traffic type of the first MU association group is latency sensitive.

Clause 43. The first mesh node of any one of clauses 37-42, further including: at least one transceiver coupled to the at least one modem; at least one antenna coupled to the at least one transceiver to wirelessly transmit signals output from the at least one transceiver and to wirelessly receive signals for input into the at least one transceiver; and a housing that encompasses at least the processing system, the at least one modem, the at least one transceiver, and at least a portion of the at least one antenna.

Clause 44. A first mesh node, including: at least one modem configured to: communicate in the wireless mesh network with a plurality of mesh nodes, and obtain a configuration for at least a first multi-user (MU) association group that includes a second mesh node as an MU group head and at least the first mesh node; a processing system configured to manage a first MU group communication by the at least one modem in accordance with the configuration; and the at least one modem configured to output part of the first MU group communication for transmission to the second mesh node using wireless channel resources managed by the second mesh node, the first MU group communication including transmissions from one or more mesh nodes.

Clause 45. The first mesh node of clause 44, where the at least one modem is configured to: obtain, from a network management unit, a request for a traffic report message; and output the traffic report message for transmission to the network management unit in response to the request, the traffic report message including the traffic flow information measured by the first mesh node and usable by the network management unit to assign the first mesh node to the first MU association group.

Clause 46. The first mesh node of any one of clauses 44-45, where the at least one modem is configured to output, to a network management unit, one or more candidate MU association groups based on traffic flow information and a routing topology of the wireless mesh network, and where the configuration for the first MU association group is based on the one or more candidate MU association groups.

Clause 47. The first mesh node of any one of clauses 44-46, further including: the at least one modem configured to obtain a configuration for a second MU association group that includes the first mesh node; and the processing system configured to: cause the at least one modem to communicate traffic associated the first MU association group via the first MU group communication using wireless channel resources managed by the second mesh node operating as the MU group head for the first MU association group; and cause the at least one modem to communicate traffic associated with the second MU association group via a second MU group communication using wireless channel resources managed by an MU group head for the second MU association group.

Clause 48. The first mesh node of clause 47, where the first mesh node is the MU group head for the second MU association group, and where the processing system is configured to manage, as the MU group head of the second MU association group, wireless channel resources associated with the second MU group communication between the first mesh node and one or more peer mesh nodes in the second MU association group.

Clause 49. The first mesh node of any one of clauses 44-48, further including: at least one transceiver coupled to the at least one modem; at least one antenna coupled to the at least one transceiver to wirelessly transmit signals output from the at least one transceiver and to wirelessly receive signals for input into the at least one transceiver; and a housing that encompasses at least the processing system, the at least one modem, the at least one transceiver, and at least a portion of the at least one antenna.

Clause 50. A method performed by a network management unit of a wireless mesh network, including: determining a routing topology of a wireless mesh network; determining one or more characteristics of traffic between a plurality of mesh nodes in the wireless mesh network; selecting, by the network management unit, at least a first mesh node of the plurality of mesh nodes as a multi-user (MU) group head of a first MU association group based on the determined one or more characteristics of the traffic and the determined routing topology; and assigning, by the network management unit, one or more other mesh nodes to the first MU association group based on the determined one or more characteristics of the traffic, the first MU association group enabling the MU group head to manage MU group communications between the MU group head and the one or more other mesh nodes using MU multiple-input-multiple-output (MU-MIMO) or orthogonal frequency division multiple access (OFDMA) in the wireless mesh network.

Clause 51. The method of clause 50, further including: informing the first mesh node and the one or more other mesh nodes regarding their respective role in the first MU association group.

Clause 52. The method of any one of clauses 50-51, where determining the one or more characteristics of the traffic includes receiving a traffic report message from each of the plurality of mesh nodes.

Clause 53. The method of clause 52, further including: sending, from the network management unit to each of the plurality of mesh nodes, a request for the traffic report message.

Clause 54. The method of any one of clauses 50-53, further including receiving, from at least the first mesh node, an indication of a first candidate MU association group in which the first mesh node is an MU group head, where selecting the first mesh node as the MU group head of the first MU association group is further based on the indication of the first candidate MU association group.

Clause 55. The method of any one of clauses 50-54, further including: determining a plurality of MU association groups based on the one or more characteristics of the traffic and the routing topology, each MU association group of the plurality of MU association groups having an MU group head and one or more member mesh nodes, where the plurality of MU association groups includes the first MU association group having the first mesh node as an MU group head and at least a second MU association group having a second mesh node as an MU group head.

Clause 56. The method of any one of clauses 50-55, further including: determining MU participation constraints for each of the plurality of mesh nodes, the MU participation constraints limiting a quantity of mesh nodes that the mesh node can support as an MU group head or limiting a quantity of MU association groups that the mesh node can join as a member; and determining the plurality of MU association groups is based on the MU participation constraints for each of the plurality of mesh nodes.

Clause 57. The method of any one of clauses 50-56, where determining the plurality of MU association groups includes: selecting the first mesh node as the MU group head of the first MU association group based on a determination that the first mesh node has a highest traffic load among the plurality of mesh nodes from among the plurality of mesh nodes not already assigned as an MU group head or a determination that the first mesh node produces a highest capacity bottleneck in the wireless mesh network from among the plurality of mesh nodes not already assigned as an MU group head; and assigning the one or more other nodes to the first MU association group based on their respective peer relationship with the first mesh node.

Clause 58. The method of any one of clauses 50-57, further including: determining an MU communication type for the first MU association group, where the MU communication type is MU-MIMO for the first MU association group based on capacity sensitivity of the traffic for the first MU association group.

Clause 59. The method of any one of clauses 50-58, further including: selecting the second mesh node as the MU group head of the second MU association group based on a determination that the second mesh node receives traffic from a highest number of source mesh nodes from among the plurality of mesh nodes not already assigned as an MU group head or a determination that the second mesh node produces a highest capacity bottleneck in the wireless mesh network from among the plurality of mesh nodes not already assigned as an MU group head; and assigning the source mesh nodes to the second MU association group based on their respective peer relationship with the second mesh node.

Clause 60. The method of any one of clauses 50-59, further including: determining an MU communication type for the second MU association group, where the MU communication type is OFDMA for the second MU association group based on latency sensitivity of the traffic for the second MU association group.

Clause 61. The method of any one of clauses 50-60, where determining the plurality of MU association groups includes: selecting the first mesh node as the MU group head of the first MU association group based on a determination that the first mesh node has a highest weighting value among weighting values for the plurality of mesh nodes; and assigning the one or more other nodes to the first MU association group based on their respective peer relationship with the first mesh node.

Clause 62. The method of clause 61, where the weighting values are based on an inverse relationship with a quantity of hops from each of the plurality of mesh nodes to a mesh portal, based on a quantity of inbound or outbound routes for each of the plurality of mesh nodes in a routing table for the wireless mesh network, or a combination thereof.

Clause 63. The method of any one of clauses 50-62, where the network management unit is collocated with the first mesh node or a root mesh node.

Clause 64. A method performed by a first mesh node in a wireless mesh network having a plurality of mesh nodes, including: providing, to a network management unit, one or more characteristics of traffic between the first mesh node and one or more other mesh nodes in the wireless mesh network; and receiving, from the network management unit, a configuration for at least a first multi-user (MU) association group that includes an MU group head and one or more other mesh nodes, the first MU association group enabling the MU group head to manage MU group communications between the MU group head and the one or more other mesh nodes using MU multiple-input-multiple-output (MU-MIMO) or orthogonal frequency division multiple access (OFDMA) in the wireless mesh network.

Clause 65. The method of clause 64, further including: receiving, from the network management unit, a request for a traffic report message; and sending the one or more characteristics of the traffic in the traffic report message to the network management unit in response to the request.

Clause 66. The method of any one of clauses 64-65, further including: determining, by the first mesh node, a first candidate MU association group in which the first mesh node is the MU group head based on the one or more characteristics of the traffic and a routing topology of the wireless mesh network; and sending an indication of the first candidate MU association group to the network management unit.

Clause 67. The method of any one of clauses 64-66, where the first mesh node is a member of the first MU association group.

Clause 68. The method of any one of clauses 64-67, where the first mesh node is the MU group head of the first MU association group.

Clause 69. An apparatus of a network management unit, including: an interface configured to communicate with one or more mesh nodes of a wireless mesh network; and a processing system configured to: determine a routing topology of a wireless mesh network; determine one or more characteristics of traffic between a plurality of mesh nodes in the wireless mesh network; select at least a first mesh node of the plurality of mesh nodes as a multi-user (MU) group head of a first MU association group based on the determined one or more characteristics of the traffic and the determined routing topology; and assign one or more other mesh nodes to the first MU association group based on the determined one or more characteristics of the traffic, the first MU association group enabling the MU group head to manage MU group communications between the MU group head and the one or more other mesh nodes using MU multiple-input-multiple-output (MU-MIMO) or orthogonal frequency division multiple access (OFDMA) in the wireless mesh network.

Clause 70. The apparatus of clause 69, where the processing system is further configured to inform, via an output of the interface, the first mesh node and the one or more other mesh nodes regarding their respective role in the first MU association group.

Clause 71. The apparatus of any one of clauses 69-70, where the interface is configured to obtain a traffic report message from each of the plurality of mesh nodes, the traffic report message including the one or more characteristics of the traffic.

Clause 72. The apparatus of clause 71, where the interface is configured to output, to each of the plurality of mesh nodes, a request for the traffic report message.

Clause 73. The apparatus of any one of clauses 69-72, where the interface is configured to obtain, from at least the first mesh node, an indication of a first candidate MU association group in which the first mesh node is an MU group head, where the processing system is configured to select the first mesh node as the MU group head of the first MU association group based on the indication of the first candidate MU association group.

Clause 74. The apparatus of any one of clauses 69-73, where the processing system is further configured to determine a plurality of MU association groups based on the one or more characteristics of the traffic and the routing topology, each MU association group of the plurality of MU association groups having an MU group head and one or more member mesh nodes, where the plurality of MU association groups includes the first MU association group having the first mesh node as an MU group head and at least a second MU association group having a second mesh node as an MU group head.

Clause 75. The apparatus of any one of clauses 69-74, where the processing system is further configured to: determine MU participation constraints for each of the plurality of mesh nodes, the MU participation constraints limiting a quantity of mesh nodes that the mesh node can support as an MU group head or limiting a quantity of MU association groups that the mesh node can join as a member; and determine the plurality of MU association groups is based on the MU participation constraints for each of the plurality of mesh nodes.

Clause 76. The apparatus of any one of clauses 69-75, where the processing system is further configured to: select the first mesh node as the MU group head of the first MU association group based on a determination that the first mesh node has a highest traffic load among the plurality of mesh nodes from among the plurality of mesh nodes not already assigned as an MU group head or a determination that the first mesh node produces a highest capacity bottleneck in the wireless mesh network from among the plurality of mesh nodes not already assigned as an MU group head; and assign the one or more other nodes to the first MU association group based on their respective peer relationship with the first mesh node.

Clause 77. The apparatus of any one of clauses 69-76, where the processing system is further configured to: determine an MU communication type for the first MU association group, where the MU communication type is MU-MIMO for the first MU association group based on capacity sensitivity of the traffic for the first MU association group.

Clause 78. The apparatus of any one of clauses 69-77, where the processing system is further configured to: select a second mesh node as an MU group head of a second MU association group based on a determination that the second mesh node receives traffic from a highest number of source mesh nodes from among the plurality of mesh nodes not already assigned as an MU group head or a determination that the second mesh node produces a highest capacity bottleneck in the wireless mesh network from among the plurality of mesh nodes not already assigned as an MU group head; and assign the source mesh nodes to the second MU association group based on their respective peer relationship with the second mesh node.

Clause 79. The apparatus of any one of clauses 69-78, where the processing system is further configured to: determine an MU communication type for the second MU association group, where the MU communication type is OFDMA for the second MU association group based on latency sensitivity of the traffic for the second MU association group.

Clause 80. The apparatus of any one of clauses 69-79, where the network management unit is collocated with the first mesh node or a root mesh node.

Clause 81. An apparatus of a mesh node, including: an interface configured to: communicate with a network management unit of a wireless mesh network; output for transmission to a network management unit, one or more characteristics of traffic between the first mesh node and one or more other mesh nodes in the wireless mesh network; and obtain a configuration for at least a first multi-user (MU) association group that includes an MU group head and one or more other mesh nodes, the first MU association group enabling the MU group head to manage MU group communications between the MU group head and the one or more other mesh nodes using MU multiple-input-multiple-output (MU-MIMO) or orthogonal frequency division multiple access (OFDMA) in the wireless mesh network.

Clause 82. The apparatus of clause 81, where the interface is further configured to: obtain, from the network management unit, a request for a traffic report message; and output the one or more characteristics of the traffic in the traffic report message to the network management unit in response to the request.

Clause 83. The apparatus of any one of clauses 81-82, where the interface is further configured to: determine a first candidate MU association group in which the first mesh node is the MU group head based on the one or more characteristics of the traffic and a routing topology of the wireless mesh network, and output an indication of the first candidate MU association group to the network management unit.

Clause 84. The apparatus of any one of clauses 81-83, where the first mesh node is a member of the first MU association group.

Clause 85. The apparatus of any one of clauses 81-84, where the first mesh node is the MU group head of the first MU association group.

Another innovative aspect of the subject matter described in this disclosure can be implemented as a computer-readable medium having stored therein instructions which, when executed by a processor, causes the processor to perform any one of the above methods.

Another innovative aspect of the subject matter described in this disclosure can be implemented as an apparatus having an interface for communicating via a wireless local area network and a processor. The processor may be configured to perform any one of the above methods.

Another innovative aspect of the subject matter described in this disclosure can be implemented as system including means for implementing any one of the above methods.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may—depending on the specific circumstances—refer to a value being greater than the threshold, greater than or equal to the threshold, less than the threshold, less than or equal to the threshold, equal to the threshold, not equal to the threshold, or the like.

As used herein, the term "determine" or "determining" encompasses a wide variety of actions and, therefore, "determining" can include calculating, computing, processing, deriving, investigating, looking up (such as via looking up in a table, a database or another data structure), or ascertaining, among other examples. Also, "determining" can include receiving (such as receiving information), accessing (such as accessing data in a memory), or obtaining, among other examples. Also, "determining" can include resolving, selecting, choosing, establishing and other such similar actions.

As used herein, a phrase referring to "at least one of" or "one or more of a list of" items refers to any combination of those items, including single ones of the items. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication, comprising:
communicating in a wireless mesh network that includes a plurality of mesh nodes; and
establishing at least a first multi-user (MU) association group that includes a first mesh node and one or more peer mesh nodes of the plurality of mesh nodes, the first MU association group enabling the first mesh node as an MU group head to operate as a multi-user access point (MU AP) in the MU association group to allocate wireless channel resources for MU communication between the first mesh node and at least a subset of the one or more peer mesh nodes that form the first MU association group, wherein the one or more peer mesh nodes operate as multi-user stations (MU STAs);
wherein establishing the at least first MU association group includes selecting the first mesh node as the MU group head of the first MU association group based, at least in part, on a routing topology of the wireless mesh network, and
wherein selecting the first mesh node as the MU group head includes selecting the first mesh node as the MU group head of the first MU association group based on at least one condition from a group consisting of:
a determination that the first mesh node has a highest traffic load from among the plurality of mesh nodes not already assigned as an MU group head;
a determination that the first mesh node produces a highest capacity bottleneck in the wireless mesh network from among the plurality of mesh nodes not already assigned as an MU group head;
a determination that the first mesh node receives traffic from a highest quantity of source mesh nodes from among the plurality of mesh nodes not already assigned as an MU group head; or
any combination thereof.

2. The method of claim 1, wherein establishing at least the first MU association group comprises:
transmitting an indication to the one or more peer mesh nodes regarding their roles as members of the first MU association group.

3. A method for wireless communication, comprising:
communicating in a wireless mesh network that includes a plurality of mesh nodes; and
establishing at least a first multi-user (MU) association group that includes a first mesh node and one or more peer mesh nodes of the plurality of mesh nodes, the first MU association group enabling the first mesh node as an MU group head to operate as a multi-user access point (MU AP) in the MU association group to allocate wireless channel resources for MU communication between the first mesh node and at least a subset of the one or more peer mesh nodes that form the first MU association group, wherein the one or more peer mesh nodes operate as multi-user stations (MU STAS);
wherein establishing the at least first MU association group includes:
selecting the first mesh node as the MU group head to manage the first MU association group based, at least in part, on the routing topology or traffic flow information of the wireless mesh network; and
selecting the one or more peer mesh nodes as members of the first MU association group based on their respective peer relationship with the first mesh node.

4. The method of claim 3, wherein establishing at least the first MU association group further comprises:
obtaining the routing topology of the wireless mesh network based, at least in part, on path selection protocol messages; and
obtaining the traffic flow information regarding traffic between the first mesh node and the one or more peer mesh nodes.

5. The method of claim 4, wherein obtaining the traffic flow information includes:
sending a request for a traffic report message to each of the one or more peer mesh nodes; and
receiving the traffic report message from each of the one or more peer mesh nodes in response to the request, the traffic report message including the traffic flow information measured by each of the one or more peer mesh nodes.

6. A method performed by a first mesh node of a wireless mesh network, comprising:

communicating in the wireless mesh network with a plurality of mesh nodes;

receiving a configuration for at least a first multi-user (MU) association group that includes a second mesh node as an MU group head and at least the first mesh node; and transmitting part of a first MU group communication to the second mesh node using wireless channel resources managed by the second mesh node, the first MU group communication including transmissions from one or more mesh nodes; and sending, from the first mesh node to a network management unit, one or more candidate MU association groups based on traffic flow information or a routing topology of the wireless mesh network, wherein the configuration for the first MU association group is based, at least in part, on the one or more candidate MU association groups.

7. The method of claim 6, further comprising:

receiving, from the network management unit, a request for a traffic report message; and sending the traffic report message to the network management unit in response to the request, the traffic report message including traffic flow information measured by the first mesh node and usable by the network management unit to assign the first mesh node to the first MU association group.

8. The method of claim 6, further comprising:

receiving a configuration for a second MU association group that includes the first mesh node;

communicating traffic associated the first MU association group via the first MU group communication using the wireless channel resources managed by the second mesh node; and communicating traffic associated with the second MU association group via a second MU group communication using wireless channel resources managed by an MU group head for the second MU association group.

9. The method of claim 8, wherein the first mesh node is the MU group head for the second MU association group, the method further comprising:

managing, by the first mesh node as the MU group head of the second MU association group, the wireless channel resources associated with the second MU group communication between the first mesh node and one or more peer mesh nodes in the second MU association group.

10. A first mesh node, comprising:

a processing system that comprises one or more processors and one or more memories coupled with the one or more processors, the processing system configured to cause the first mesh node to:

communicate in a wireless mesh network that includes a plurality of mesh nodes;

establish at least a first multi-user (MU) association group that includes the first mesh node and one or more peer mesh nodes of the plurality of mesh nodes, the first MU association group enabling the first mesh node as an MU group head to operate as a multi-user access point (MU AP) in the MU association group to allocate wireless channel resources for MU communication between the first mesh node and at least a subset of the one or more peer mesh nodes that form the first MU association group, wherein the one or more peer mesh nodes operate as multi-user stations (MU STAS); and select the first mesh node as the MU group head of the first MU association group based, at least in part, on a routing topology of the wireless mesh network, and wherein selecting the first mesh node as the MU group head includes selecting the first mesh node as the MU group head of the first MU association group based on at least one condition from a group consisting of:

a determination that the first mesh node has a highest traffic load from among the plurality of mesh nodes not already assigned as an MU group head;

a determination that the first mesh node produces a highest capacity bottleneck in the wireless mesh network from among the plurality of mesh nodes not already assigned as an MU group head;

a determination that the first mesh node receives traffic from a highest quantity of source mesh nodes from among the plurality of mesh nodes not already assigned as an MU group head; or any combination thereof.

11. The first mesh node of claim 10, wherein the processing system is further configured to cause the first mesh node to output an indication for transmission to the one or more peer mesh nodes regarding their roles as members of the first MU association group.

12. The first mesh node of claim 10, wherein the processing system is further configured to cause the first mesh node to select the first mesh node as the MU group head of the first MU association group based on at least one condition from a group consisting of:

the first mesh node having a lowest quantity of hops to a mesh portal as compared to quantities of hops between each of the plurality of mesh nodes and the mesh portal, the first mesh node having a highest quantity of inbound or outbound routes as compared to quantities of inbound or output routes for each of the plurality of mesh nodes in a routing table for the wireless mesh network, and a weighted combination thereof.

13. The first mesh node of claim 10, wherein the processing system is further configured to cause the first mesh node to:

obtain, from various mesh nodes of the wireless mesh network, candidate MU association groups determined by the various mesh nodes, and select the first mesh node as the MU group head of the first MU association group based, at least in part, on the candidate MU association groups.

14. The first mesh node of claim 10, wherein the processing system is further configured to cause the first mesh node to determine a plurality of MU association groups based on traffic flow information and a routing topology of the wireless mesh network, each MU association group having a respective MU group head and one or more respective member mesh nodes.

15. The first mesh node of claim 14, wherein the processing system is further configured to cause the first mesh node to:

determine MU participation constraints for each of the plurality of mesh nodes, the MU participation constraints limiting a quantity of mesh nodes that a mesh node can manage as an MU group head or limiting a quantity of MU association groups in which the mesh node can participate as a member; and select the plurality of MU association groups based, at least in part, on the MU participation constraints for each of the plurality of mesh nodes.

16. The first mesh node of claim 10, wherein the first mesh node operates as, or is collocated with, a network management unit of the wireless mesh network.

17. The first mesh node of claim 10, further comprising:
at least one transceiver;
at least one antenna coupled to the at least one transceiver to wirelessly transmit signals output from the at least one transceiver and to wirelessly receive signals for input into the at least one transceiver; and
a housing that encompasses at least the processing system, at least one modem, the at least one transceiver, and at least a portion of the at least one antenna.

18. A first mesh node, comprising:
a processing system that comprises one or more processors and one or more memories coupled with the one or more processors, the processing system configured to cause the first mesh node to:
communicate in a wireless mesh network that includes a plurality of mesh nodes;
establish at least a first multi-user (MU) association group that includes the first mesh node and one or more peer mesh nodes of the plurality of mesh nodes, the first MU association group enabling the first mesh node as an MU group head to operate as a multi-user access point (MU AP) in the MU association group to allocate wireless channel resources for MU communication between the first mesh node and at least a subset of the one or more peer mesh nodes that form the first MU association group, wherein the one or more peer mesh nodes operate as multi-user stations (MU STAS);
select the first mesh node as the MU group head to manage the first MU association group based, at least in part, on the routing topology or traffic flow information of the wireless mesh network; and
select the one or more peer mesh nodes as members of the first MU association group based on their respective peer relationship with the first mesh node.

19. The first mesh node of claim 18, wherein the processing system is further configured to cause the first mesh node to:
obtain the routing topology of the wireless mesh network based, at least in part, on path selection protocol messages; and
obtain the traffic flow information regarding traffic between the first mesh node and the one or more peer mesh nodes.

20. The first mesh node of claim 19, wherein the processing system is further configured to cause the first mesh node to:
output a request for a traffic report message to each of the one or more peer mesh nodes; and
obtain the traffic report message from each of the one or more peer mesh nodes in response to the request, the traffic report message including the traffic flow information measured by each of the one or more peer mesh nodes.

21. A first mesh node, comprising:
a processing system that comprises one or more processors and one or more memories coupled with the one or more processors, the processing system configured to cause the first mesh node to:
communicate in a wireless mesh network with a plurality of mesh nodes,
obtain a configuration for at least a first multi-user (MU) association group that includes a second mesh node as an MU group head and at least the first mesh node;
manage a first MU group communication in accordance with the configuration;
output part of the first MU group communication for transmission to the second mesh node using wireless channel resources managed by the second mesh node, the first MU group communication including transmissions from one or more mesh nodes; and
output, to a network management unit, one or more candidate MU association groups based on traffic flow information or a routing topology of the wireless mesh network,
wherein the configuration for the first MU association group is based, at least in part, on the one or more candidate MU association groups.

22. The first mesh node of claim 21, wherein the processing system is further configured to cause the first mesh node to:
obtain, from a network management unit, a request for a traffic report message; and
output the traffic report message for transmission to the network management unit in response to the request, the traffic report message including traffic flow information measured by the first mesh node and usable by the network management unit to assign the first mesh node to the first MU association group.

23. The first mesh node of claim 21, wherein the processing system is further configured to cause the first mesh node to:
obtain a configuration for a second MU association group that includes the first mesh node;
communicate traffic associated the first MU association group via the first MU group communication using the wireless channel resources managed by the second mesh node operating as the MU group head for the first MU association group; and
communicate traffic associated with the second MU association group via a second MU group communication using wireless channel resources managed by an MU group head for the second MU association group.

24. The first mesh node of claim 23,
wherein the first mesh node is the MU group head for the second MU association group, and
wherein the processing system is further configured to cause the first mesh node to manage, as the MU group head of the second MU association group, the wireless channel resources associated with the second MU group communication between the first mesh node and one or more peer mesh nodes in the second MU association group.

25. The first mesh node of claim 21, further comprising:
at least one transceiver;
at least one antenna coupled to the at least one transceiver to wirelessly transmit signals output from the at least one transceiver and to wirelessly receive signals for input into the at least one transceiver; and
a housing that encompasses at least the processing system, at least one modem, the at least one transceiver, and at least a portion of the at least one antenna.

* * * * *